United States Patent [19]

Ogawa et al.

[11] Patent Number: 5,031,715
[45] Date of Patent: Jul. 16, 1991

[54] CRUISE-CONTROL SYSTEM WITH FUEL AND THROTTLE VALVE CONTROL

[75] Inventors: Kenichi Ogawa; Hitoshi Hyodo, both of Aichi, Japan

[73] Assignee: Aisin Seiki K.K., Aichi, Japan

[21] Appl. No.: 413,555

[22] Filed: Sep. 27, 1989

[30] Foreign Application Priority Data

Sep. 29, 1988 [JP] Japan ............................. 63-244751
Sep. 29, 1988 [JP] Japan ............................. 63-244755

[51] Int. Cl.⁵ ............................................. B60K 31/04
[52] U.S. Cl. ............................ 180/179; 123/198 DB;
123/325; 364/431.07; 364/431.09
[58] Field of Search ............ 180/172, 174, 178, 179,
180/175, 176, 177; 364/426.04, 431.07, 431.09;
123/357, 359, 361, 375, 376, 379, 399, 325, 198
DB; 324/161

[56] References Cited

U.S. PATENT DOCUMENTS 4,467,428 8/1984 Caldwell .................... 180/179 X
4,877,101 10/1989 Tada et al. ................. 180/179 X

FOREIGN PATENT DOCUMENTS 0022537 2/1985 Japan ............................ 180/178
0135334 7/1985 Japan ........................ 364/426.04
0171618 8/1986 Japan ............................ 180/178
0285139 12/1986 Japan ............................ 180/178

Primary Examiner—Andres Kashnikow
Assistant Examiner—Brian L. Johnson
Attorney, Agent, or Firm—Sughrue, Mion, Zinn, Macpeak & Seas

[57] ABSTRACT

In a cruise-control system mounted on an automobile after a cruise-control mode has been established, a microcomputer prevents the electronic fuel-injection system of the automobile from cutting off the supply of fuel to the engine. This prevents the velocity of the automobile from surging when the automobile does down a hill. Another embodiment of a cruise-control system has an electronic fuel-injection system and an actuator that controls the opening of the throttle valve. When the opening decreases to a small opening slightly larger than the opening at which the fuel-injection system stops supplying fuel to the engine, the fuel-injection system maintains the valve at the small opening.

2 Claims, 18 Drawing Sheets

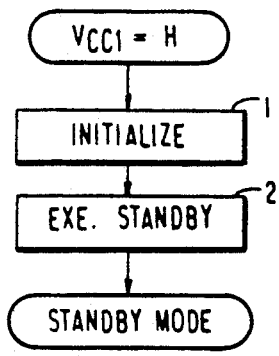
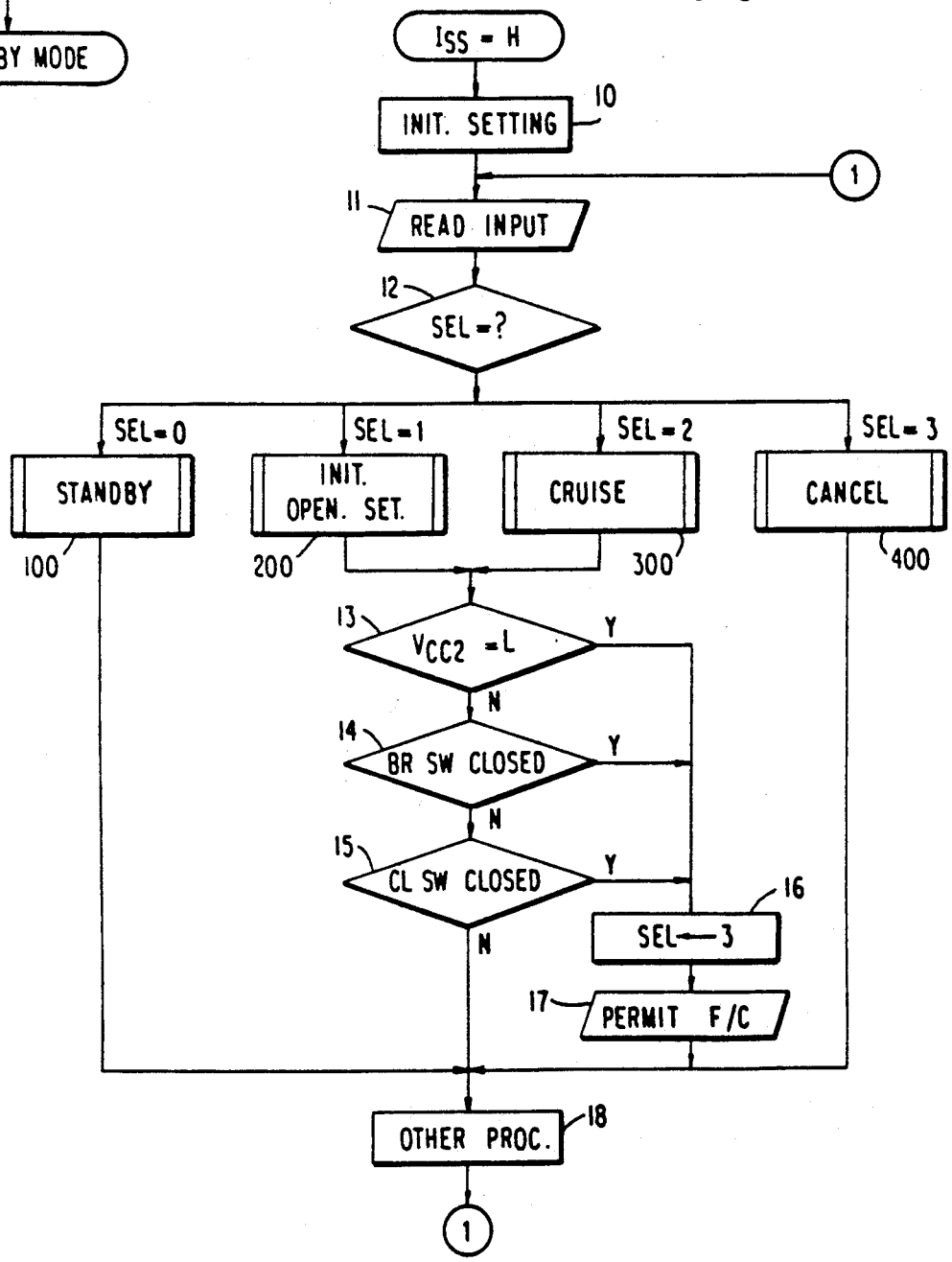

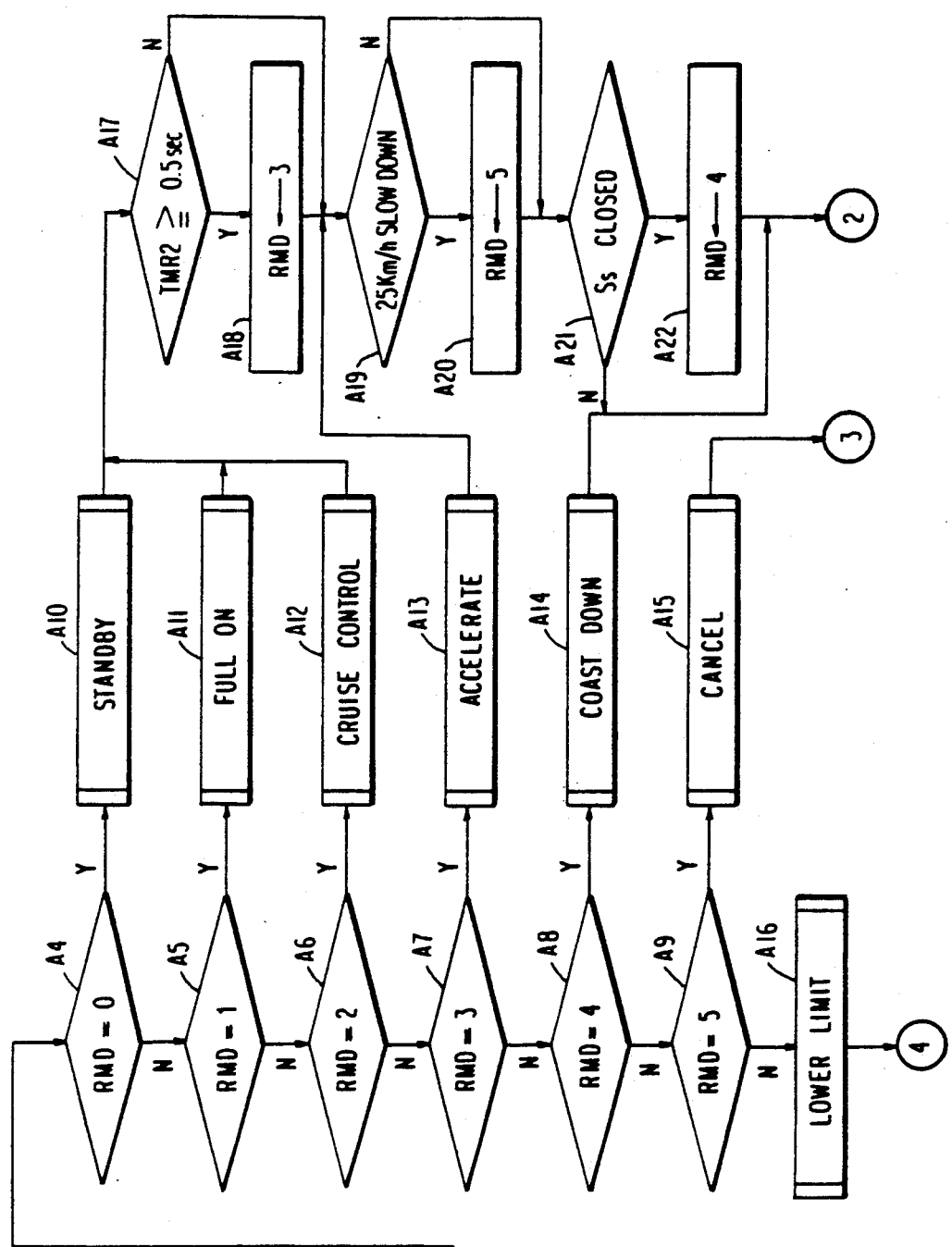
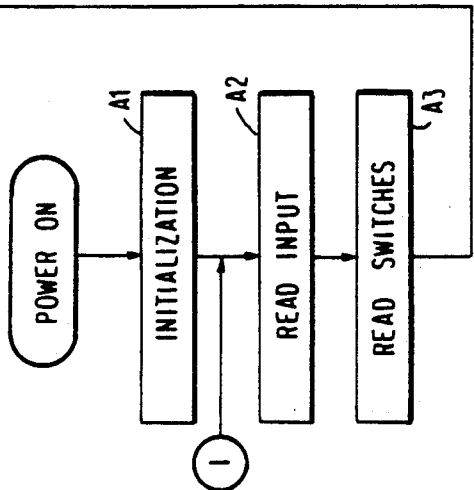
FIG. 7a

CRUISE-CONTROL SYSTEM WITH FUEL AND THROTTLE VALVE CONTROL

FIELD OF THE INVENTION

The present invention relates to a cruise-control system which is mounted on a vehicle to maintain a predetermined speed and, more particularly, to a cruise-control system which automatically adjusts the posture, or angular position, of a means determining the rotational speed of the engine, such as the throttle valve, to make the present vehicle speed equal to a selected speed.

BACKGROUND OF THE INVENTION

A cruise-control system compares the present speed with a desired speed. If the present speed is lower than the desired speed, the car speed is increased. If the present speed is higher than the desired speed, the vehicle is decelerated. In recent years, automobiles have been required to have numerous functions or have high efficiency. Thus, automobiles must cope with such complex situations.

As an example, an electronic fuel-injection system is used. The electronic fuel-injection system employs a microcomputer or other electronic control unit to control the amount of fuel supplied to the engine by adjusting the opening of the throttle valve, the flow of air, or the engine speed.

One method of controlling fuel supply by an electronic fuel-injection system consists in cutting off the supply of fuel from the throttle valve when the engine speed is in excess of a certain valve and when the valve is at idle throttle. This is effective in improving the braking force of the engine and enhancing the fuel consumption ratio. Unfortunately, if this method is combined with a cruise-control system, the following problems take place.

A cruise-control system closes the throttle to prevent the vehicle speed from increasing. When the vehicle coasts down a steep hill, the throttle may be fully closed. At this time, it is necessary to cut off the supply of fuel and so the electronic fuel-injection system performs this job. If so, the engine brakes the vehicle, so that the vehicle speed drops rapidly. Then, the cruise-control system opens the throttle to suppress the reduction in the vehicle speed. This, in turn, permits the electronic fuel-injection system to supply fuel. This resupply of fuel increases the vehicle speed again. In this way, the aforementioned steps are repeated. As a result, the vehicle speed surges. This makes the passengers very unpleasant.

In an attempt to solve the foregoing problems, Japanese Patent Laid-Open No. 11444/1988 discloses a new cruise-control system. Once the operating conditions require a fuel reduction while the vehicle speed is maintained by this cruise-control system, the fuel reduction is continued as long as the difference between the intended vehicle speed and the present speed is less than a predetermined level even if the aforementioned operating conditions no longer hold.

Japanese Patent Laid-Open No. 135334/1985 discloses another cruise-control system. When a desired speed is maintained by this system, if the operating conditions permit a fuel reduction, then the supply of fuel is decreased. Subsequently, the loop gain for the cruise control is set to a small value for a given time. This prolongs the period during which the fuel cutoff is not permitted by the operating conditions. That is, the supply of fuel is cut off at longer intervals of time. Hence, the passengers will feel less unpleasant.

Japanese Patent Laid-Open No. 196828/1986 discloses a further cruise-control system. This system stops the supply of fuel if the throttle is fully closed and if the present vehicle speed is larger than the desired speed by a predetermined value, to prevent the vehicle speed becoming much larger than the desired speed when the vehicle goes down a steep hill.

In any of the aforementioned known cruise-control systems, the response characteristics are lowered substantially in order that the operating conditions allow a fuel reduction at longer intervals of time. Although the surge occurring when the vehicle goes down a hill is reduced, it is not prevented. Therefore, the passengers still feel uncomfortable. Specifically, depending on the set reference value from which the speed difference is calculated, on the loop gain, or on the steepness of the hill, fuel reduction is caused by the operating conditions at the same intervals of time, thus producing uncomfortable surge. Conversely, when fuel cut is made unnecessary, it still continues.

SUMMARY OF THE INVENTION

It is an object of the invention to provide a cruise-control system which prevents surge when the vehicle goes down a hill.

This object is achieved by a cruise-control system comprising: a rotational speed-determining means which is mounted on the intake side of the engine of a vehicle and determine the rotational speed of the output shaft of the engine by the posture of the rotational speed-determining means; fuel supply means acting to supply fuel to the engine and equipped with a posture-detecting means which detects the posture of the rotational speed-determining means, the fuel supply means cuts off the supply of fuel to the engine when the posture-detecting means detects the posture of the rotational speed-determining means that corresponds to a certain low speed of the engine; driving means for modifying the posture of the rotational speed-determining means; velocity-detecting means for detecting the present velocity of the vehicle; input means which receive certain instructions; and control means which, when the input means instruct the control means to maintain a certain velocity, prevent the fuel supply means from cutting off the supply of fuel to the engine, set an intended velocity, compare the intended velocity with the present velocity, and activate the driving means to energize the driving means so that the present velocity may agree with the intended velocity, and which, when the input means instruct resumption, permit the fuel supply means to cut off the supply of fuel to the engine.

In this cruise-control system, the control means set the operation mode to cruise-control mode in response to the instruction from the input means. The fuel supply means are prevented from cutting off the supply of fuel to the engine until the cruise-control mode is canceled. Therefore, if the operating conditions require a fuel cut, the fuel supply means continue supply of fuel. Accordingly, when the vehicle goes down a hill, no surge is produced.

It is another object of the invention to provide a cruise-control system which is installed on a vehicle having a fuel-injection means such as an electronic fuel-injection system and which, when the vehicle goes down a hill while the vehicle velocity is maintained by the cruise-control system, prevents the velocity from surging to reduce passengers' uncomfortableness.

The above object is achieved by a cruise-control system comprising: an actuator means that adjusts the opening of a valve for controlling the driving power produced by the power source of a vehicle; a fuel control means that controls the supply of fuel to the power source; an opening-detecting means for directly or indirectly detecting the opening of the valve; a velocity-detecting means which detects the velocity of the vehicle; a switching means which permits one to store a desired cruise velocity in a storage means; and an electronic control means which includes the storage means, stores the desired velocity in the storage means in response to the operation of the switching means, controls the actuator means according to the actual vehicle velocity detected by the velocity-detecting means and according to the desired velocity stored in the storage means, monitors the opening detected by the opening-detecting means, and which, when the monitored opening becomes larger than the opening at which the fuel control means cuts off the supply of fuel, controls the actuator means and holds the opening of the valve constant.

In this cruise-control system, when the vehicle goes down a hill, the actual vehicle velocity exceeds the intended velocity. At this time, the actuator means acts to close the valve until a certain opening is reached. Then, this opening is maintained. This maintained opening is set larger than the opening at which the fuel control means such as an electronic fuel-injection system ceases to supply fuel and, therefore, while this cruise-control system is operating, the supply of fuel is not cut even if the vehicle goes down a hill. Hence, it is assured that the vehicle speed is prevented from surging when the vehicle goes down a hill.

The maintained opening may be canceled under various conditions. In one example described later, the maintained opening is canceled when the actual vehicle velocity is less than the desired velocity by more than 2 Km/h and this condition continues for 3 seconds.

Other objects and features of the invention will appear in the course of the description thereof which follows.

BRIEF DESCRIPTION OF THE DRAWINGS

FIG. 2, 3, 4a, 4b, 4c, and 4d are flowcharts illustrating operations performed under the control of the microcomputer 1 shown in FIG. 1;

FIG. 5b is a cross-sectional view taken on line VB—VB of FIG. 5a;

FIGS. 7a, 7b, 7c, 7d, 7e, 7f, 7g, 7h, 7i, 7j, 7k, 7l, 7m, and 7n are flowcharts illustrating operations performed by the microcomputer 290 shown in FIG. 6;

DETAILED DESCRIPTION OF THE INVENTION

Figure 5A:
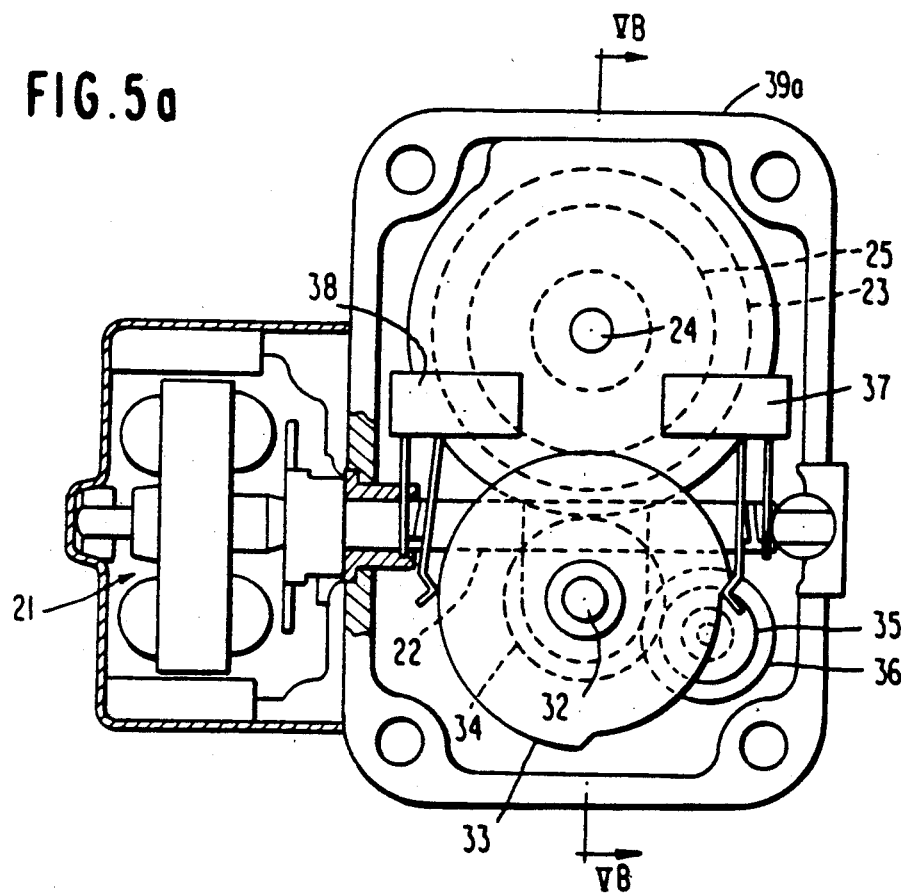
FIG. 5a is a cross-sectional view of the mechanism of the cruise-control system shown in FIG. 1.
Figure 5B:
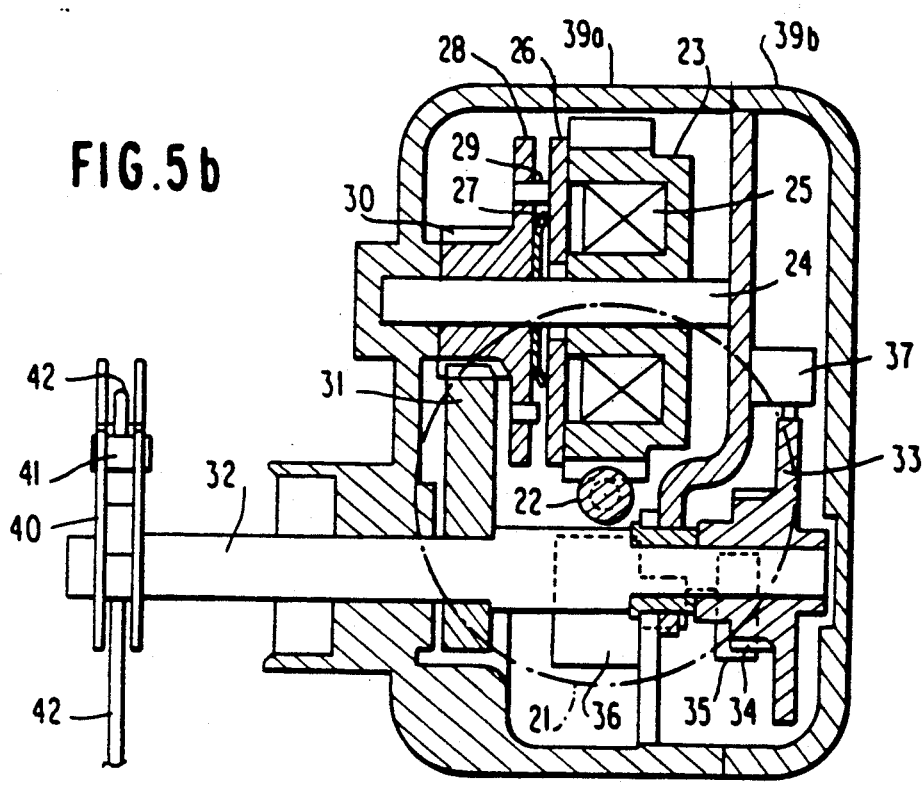

We now describe a cruise-control system installed on a vehicle with manual transmission. This system has an actuator consisting of a mechanism that electrically opens and closes the throttle valve. This mechanism is shown in FIGS. 5a and 5b in cross section and has a power source consisting of an electric motor 21 rigidly fixed to a casing 39a. The rotating shaft of the motor 21 is coupled to a worm gear 22 that is pivotally mounted to the casing 39a.

A gear 23 which drives the clutch is in mesh with the worm gear 22. The gear 23 is rotatably held to a stationary shaft 24 that is firmly fixed to the casing 39a. A coil 25 is mounted inside the gear 23 to which a nonmagnetic clutch plate 26 is rigidly fixed. A magnetic gear 28 which is driven by the clutch is disposed on the opposite side of a leaf spring 27 from the clutch plate 26. An engaging protrusion 29 is formed on the surface of the clutch plate 26 and received in an annular groove formed in the clutch plate 26.

When the coil 25 is energized, the leaf spring 27 disconnects the clutch plate 26 from the clutch-driven gear 28, i.e., the clutch is disengaged, and so no rotary power is transmitted between the clutch-driving gear 23 and the clutch-driven gear 28. When the coil 25 is energized, the magnetic flux produced across the coil attracts the clutch-driven gear 28. When the engaging protrusion 29 on the clutch surface of the clutch-driven gear 28 faces the annular groove formed in the clutch plate 26, the protrusion 29 is engaged in the groove, i.e., the clutch is engaged. Under this condition, rotary power is transmitted between the clutch-driving gear 23 and the clutch-driven gear 28. The mechanism formed by these components will be hereinafter referred to as the solenoid clutch.

The clutch-driven gear 28 is rotatably held to the stationary shaft 24 in the same way as the clutch-driving gear 23. The gear 28 has teeth 30 which are in mesh with a sector gear 31. This gear 31 is rigidly fixed to an intermediate portion of the output shaft 32 that is rotatably held to the casing 39a.

A cam plate 33 having teeth 34 is rigidly affixed to the inner end of the output shaft 32. A gear 35 that is in mesh with the teeth 34 is firmly secured to the input shaft of a potentiometer 36 which produces a voltage indicating the angular position of the output shaft 32. The cam plate 33 is formed with a groove which cooperates with limit switches 37 and 38 to detect the limit position of the output shaft 32. In particular, when the angular position of the output shaft 32 exceeds the angle corresponding to the upper limit of the throttle opening, the operator element of the limit switch 37 drops into the grooves in the cam plate 33, thus turning off the switch 37. When the angular position of the output shaft 32 is less than the angle corresponding to the lower limit of the throttle opening, the operator element of the limit switch 38 falls into the groove in the cam surface, whereby the switch 38 is turned off. The cam plate 33, the limit switches 37 and 38, and other components are protected from dust by a cover 39b.

A sectorial output pulley 40 is rigidly fixed to the outer end of the output shaft 32. A pin 41 which fixes one end of a wire 42 is anchored to the pulley 40. The other end of the wire 42 is connected to a connecting mechanism 100 shown in FIG. 5c.

Figure 5C:
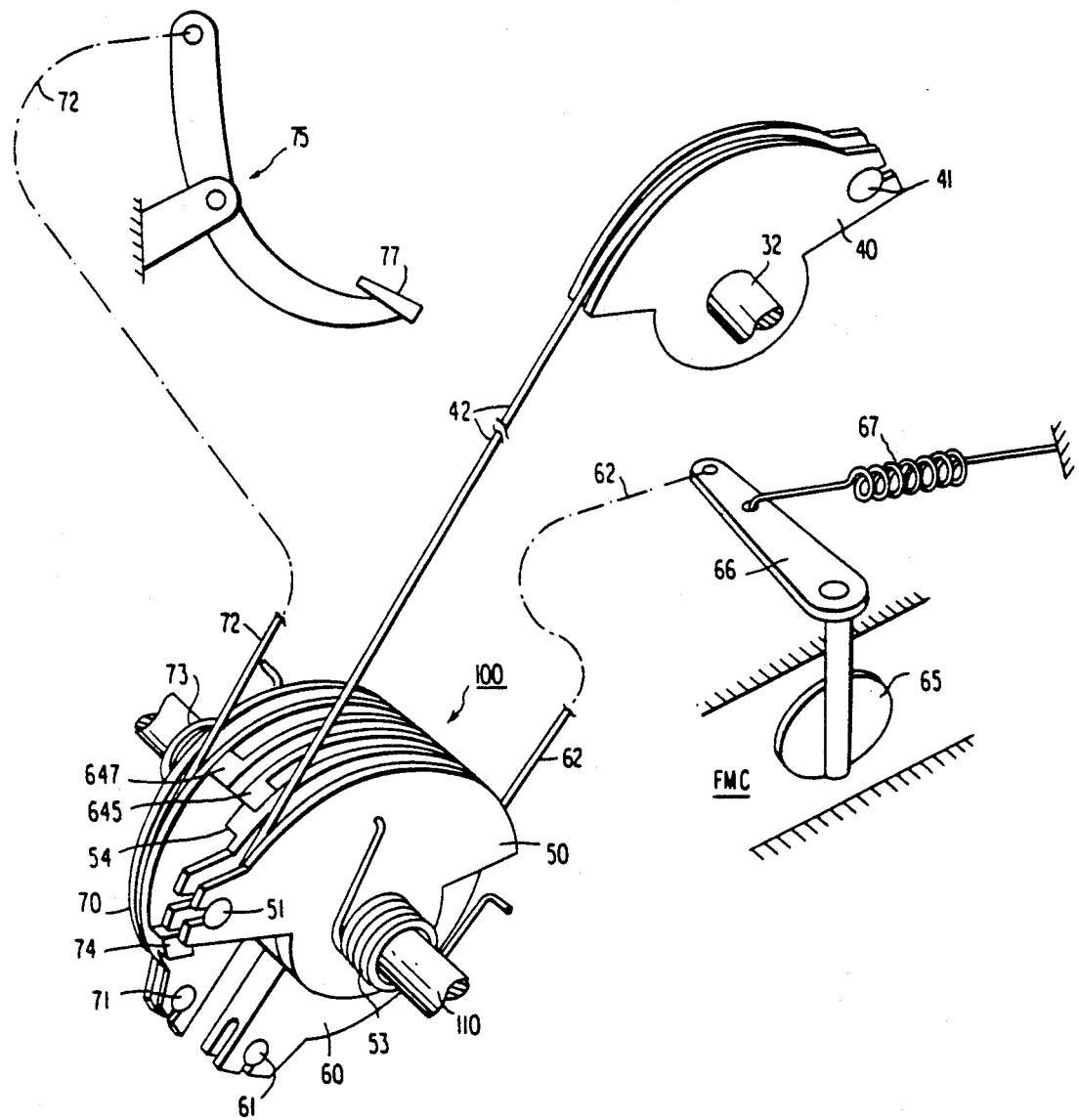
FIG. 5c is a perspective view of a connector 100 which connects the output pulley 40 shown in FIG. 5b with a throttle valve 65.

Referring next to FIG. 5c, the aforementioned mechanism for electrically driving the throttle valve is organically connected to the accelerator pedal 75 by the connecting mechanism 100. The output from the former mechanism is transmitted to the throttle valve 65 mounted in a mixing chamber FMC. The connecting mechanism 100 consists principally of a first sector pulley 50, a second pulley 60, and a third pulley 70. These pulleys are rotatably held to a stationary shaft 110. The second pulley 60 is sandwiched between the first pulley 50 and the third pulley 70.

The first pulley 50 is connected with the output pulley 40. A pin 51 fixing the other end of the wire 42 is anchored to the pulley 50, which is urged to wind up the wire 42 by a coil spring 53. The outer surface of the pulley 50 which is adjacent to the second pulley 60 has a protrusion 54.

The third pulley 70 is connected with the accelerator pedal 77 via a wire 72. One end of the wire 72 is rigidly fixed to a pin 71 that is anchored to the third pulley 70. The other end of the wire 72 is connected to the point of action 75 of the accelerator pedal 77. The third pulley 70 is forced to wind up the wire 72 by a coil spring 73. The outer surface of the third pulley 70 which is adjacent to the second pulley 60 has a protrusion 74.

The second pulley 60 is connected via a wire 62 with the throttle valve 65. One end of the wire 62 is rigidly attached to a pin 61 which is anchored to the second pulley 60, while the other end is connected to the point of action of a link mechanism 66 connected with the throttle valve 65. The link mechanism 66 is urged to close the valve 65 by a coil spring 67. The force of the spring 67 is transmitted to the second pulley 60 via the wire 62. Therefore, the second pulley 60 is rotated in the direction to pay out the wire 62. The outer surfaces of the second pulley 60 have protrusions $64_5$ and $64_7$, respectively, which support the protrusions 54 and 74, respectively, formed on the first pulley 50 and the third pulley 70, respectively. Thus, rotation of the second pulley is restricted by the angular position either of the first pulley 50 or of the third pulley 70.

The operation of these mechanisms is now described. Where the action is observed from the side of the first pulley 50, when the mechanism electrically driving the throttle valve rotates the first pulley 50 to pay out the wire 42, the protrusion 54 engages the protrusion $64_5$. Then, the first pulley 50 rotates with the second pulley 60. The wire 62 opens the throttle valve 65 via the link mechanism 66. As viewed from the side of the third pulley 70, the accelerator pedal 75 rotates the third wire 70 in the direction to pay out the wire 72. This causes the protrusion 74 to engage with the protrusion $64_7$, so that the second pulley 60 and the third pulley 70 rotate as a unit. The wire 62 opens the valve 65 via the link mechanism 66. In this case, if the first pulley 50 and the third pulley 70 are rotated in the direction to pay out the wire 42 or 72, and if the second pulley 60 winds up the wire 62, only the pulley rotating through the largest angle works; the other pulleys run idle, as can be seen from FIG. 5c. In other words, one of the first pulley 50 and the third pulley 70 rotates the second pulley 60 in the direction to wind up the wire 62. The other does not rotate back the second pulley.

The rotary power which is applied to the first pulley 50 from the coil spring 53 in the direction to wind up the wire 42 is transmitted to the output pulley 40 of the throttle driving mechanism via the wire 42. The power is then transmitted from the output shaft 32 to the clutch-driven gear 28 via the sector gear 31. At this time, if the solenoid clutch is engaged, i.e., the rotary power is transmitted from the clutch-driven gear 28 to the clutch-driving gear 23, then the engaged worm gear 2 prevents the clutch-driving gear 23 from rotating, and the first pulley 50 is made fixed. If the solenoid clutch is disengaged, i.e., the rotary power is not transmitted from the clutch-driven gear 28 to the clutch-driving gear 23, then substantially no load is applied to the output shaft 32. Then, the coil spring 53 rotates the first pulley 50 in the direction to wind up the wire 42. That is, when the coil 25 of the mechanism electrically driving the throttle valve is deenergized, if the solenoid clutch is not at fault, the first pulley 50 is turned by the coil spring 53 in the direction to wind up the wire 42. The pulley 50 is returned to its idle position. When the protrusion $64_5$ on the second pulley 60 bears against the protrusion 54 on the first pulley 50 which is located at the idle position, the second pulley 60 sets the throttle valve 65 at an opening for engine idle.

FIG. 5c shows the condition in which the accelerator pedal 77 is released. In this state, the output shaft 32 has rotated to the uppermost position (FIG. 5a) corresponding to the greatest opening of the throttle valve 65. The pulling force of the tension coil spring 67 is applied to the second pulley 60 via the wire 62 to pull the link mechanism 66 in such a direction as to close the valve and, therefore, the second pulley 60 is rotated in a counterclockwise direction. However, as the output shaft 12 is rotated via the sectorial output pulley 40 and the wire 42, the first pulley 50 is rotated in a clockwise direction. The protrusion 54 on the outer surface of the first pulley 50 bears on the protrusion $64_5$ formed on the outer surface of the second pulley 60. This rotates the second pulley 60 in a clockwise direction to the uppermost position corresponding to the maximum opening of the throttle valve against the pulling force of the coil spring 67.

Under this condition, if the output shaft rotates toward the lowermost position, the sectorial output pulley 40 rotates in a counterclockwise direction to pay out the wire 42. That is, the tensile force is no longer applied to the wire 42. Then, the repulsive force of the coil spring 53 rotates the first pulley 50 counterclockwise. The protrusion 54 on the pulley 50 is about to move in a counterclockwise direction away from the protrusion $64_5$ on the second pulley 60. Since the second pulley 60 is rotated in a counterclockwise direction by the pulling force of the tension coil spring 67, rotation of the output shaft 32 toward its lowermost position rotates the first pulley 50 and the second pulley 60 counterclockwise while the protrusion $64_5$ bears against the protrusion 54. The throttle valve 65 is rotated from its maximum opening position toward its idling position counterclockwise. That is, when the accelerator pedal 77 is released, if the output shaft 32 is rotated to its uppermost position, the first pulley 50 and the second pulley 60 rotate in a clockwise direction, increasing the opening of the valve 65. If the output shaft 32 is rotated to its lowermost position, the first pulley 50 and the second pulley 60 are rotated in a counterclockwise direction, thus reducing the opening of the valve 65.

As shown in FIG. 5c, when the output shaft 32 opens the throttle valve 65 fully, if the driver pushes down on the accelerator pedal 77, the third pulley 70 is rotated clockwise via the wire 72. The protrusion 74 on the pulley 70 makes contact with the protrusion $64_7$ on the second pulley 60 only when the pedal 77 is depressed fully. In the other case, the protrusion 74 does not make contact with the protrusion $64_7$. That is, the accelerator pedal can be moved from its released position to the position corresponding to the maximum opening and then back to its released position. In response to this, the third pulley 70 rotates clockwise or counterclockwise. The distance traveled by the pedal 77 is independent of the opening of the valve 65, because the valve 65 is prevented from rotating by the output shaft 32.

When the output shaft 32 is returned from the uppermost position shown in FIG. 5c to the lowermost position, or idling opening, if the accelerator pedal 77 is released, then the throttle valve 65 is at idle opening. If the pedal 77 is depressed to a position corresponding to the intermediate opening, the output shaft 32 rotates to its lowermost position. However, the protrusion $64_7$ on the second pulley 60 bears against the protrusion 74 on the third pulley 70 to prevent further counterclockwise rotation of the shaft. Consequently, the valve 65 is at an intermediate opening.

In summary, when the accelerator pedal 77 is released, the throttle opening corresponds to the angular position of the output shaft 32. If the pedal 77 is depressed more than the throttle opening determined by the angular position of the output shaft 32, the throttle opening is determined by the distance traveled by the pedal 77. If the output shaft 32 is rotated to its lowermost position, the throttle opening is determined by the distance traveled by the pedal. If the output shaft 32 is rotated more than the throttle opening corresponding to the distance traveled by the pedal, the throttle opening is determined by the angular position of the output shaft 32. Accordingly, when the cruise-control system is stopped from operating, if the output shaft 32 is returned to its lowermost position, the opening of the valve 65 corresponds to the distance traveled by the pedal 77. In this state, the driver controls the vehicle velocity by operating the accelerator pedal by his or her foot.

Figure 1:
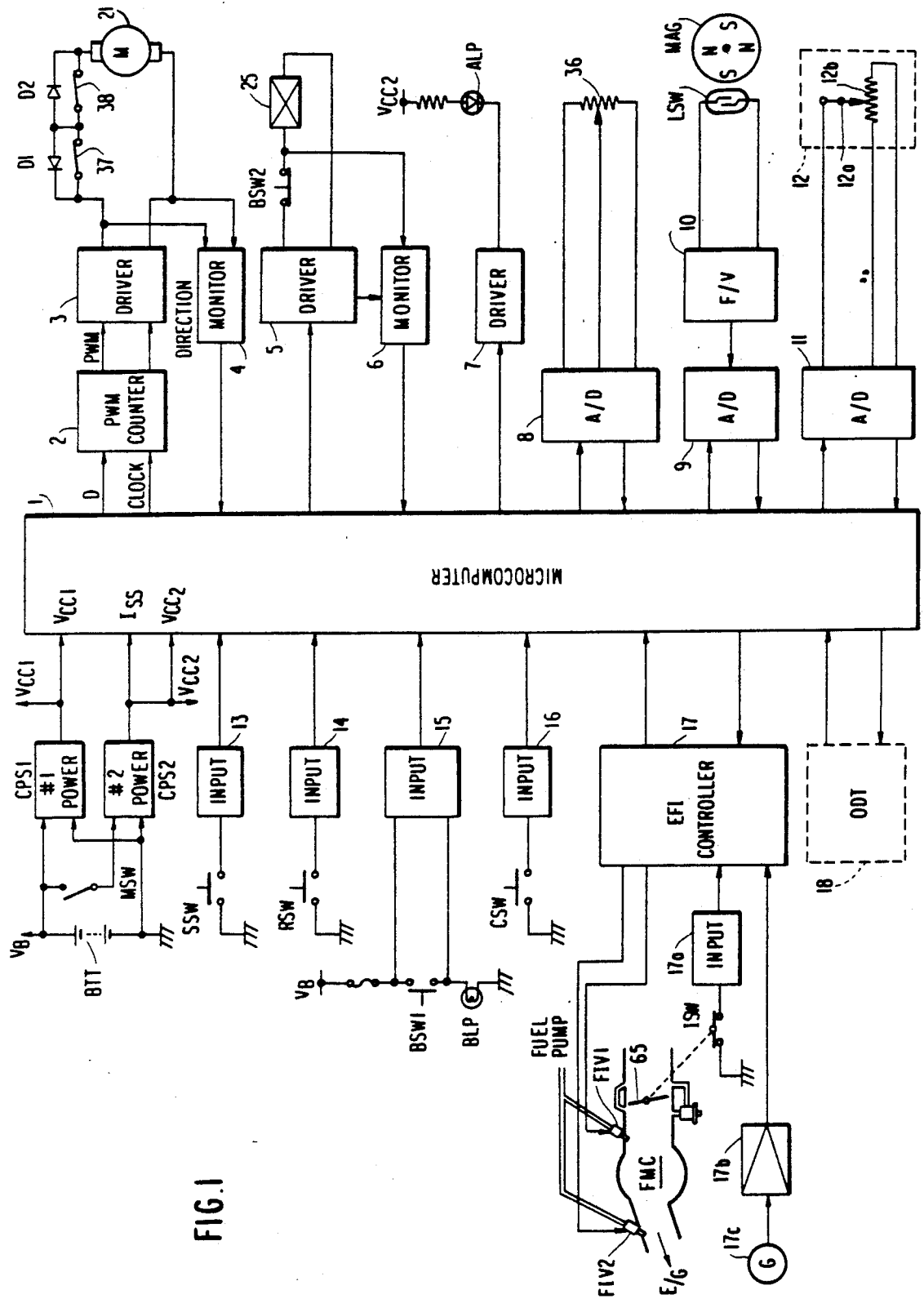
FIG. 1 is a block diagram of the electrical control circuit of a cruise-control system according to the invention.

The aforementioned mechanism for electrically opening and closing the throttle is controlled by the electrical control circuit shown in FIG. 1. This electrical control circuit comprises a microcomputer (hereinafter referred to as the CPU 1), an electronic fuel-injection (EFI) controller 17, various drivers, converters, input circuits, switches, and other components. These various components are supplied with voltage $V_B$ from battery BTT, a constant voltage Vcc1 or Vcc2 from a first or second regulated power supply $CPS_1$ or $CPS_2$. Power lines are not shown particularly in FIG. 1, because only connection of the battery BTT is needed to supply the voltages $V_B$ and Vcc1. As long as the battery BTT is connected, they are always supplied. The voltage Vcc2 is supplied when main switch MSW is turned on. This voltage Vcc2 is applied to only the CPU 1 and a warning lamp ALP as shown in FIG. 1.

The CPU 1 receives the constant voltage Vcc2 from the second regulated power supply $CPS_2$ to set the operation mode to a standby mode and to return the operation mode to a normal mode. In the standby mode, all the input and output ports are made to show high impedance. Only the immediately previous states of registers and immediately previous contents of RAMs are retained, and operation according to software is not allowed. In this standby mode, electric power is saved. When the application of the constant voltage Vcc2 ceases, the CPU 1 sets the operation mode to the standby mode. Once this mode is set, operation according to software is inhibited. Therefore, it is necessary to operate hardware to return the operation mode to the normal mode. For this purpose, a control port Iss is provided. When the constant voltage Vcc2 is applied to this control port from the second regulated power supply $CPS_2$, the operation mode goes back to the normal mode from the standby mode. The function of each component is next described.

A PWM counter 2 receives PWM data D and clock pulses from the CPU 1. The data D takes a positive or negative value. The sign indicates the direction in which the motor 21 is driven. The magnitude indicates on duty. When the PWM data D fed to the counter 2 is not zero, it causes PWM pulses to go high. If their sign is positive, a signal controlling the direction in which the motor is driven is made to go high. If the sign is negative, the counter causes the signal to go low. Subsequently, if the total count becomes equal to the absolute value of the PWM data D, the PWM pulses are caused to go low.

The PWM pulses and the signal controlling the direction in which the motor is driven are supplied to a motor driver 3 from the PWM counter 2. The aforementioned motor 21 of the mechanism electrically driving the throttle is connected with the driver 3. If the direction-controlling signal is at high level, the driver 3 rotates the motor 21 in a forward direction as long as the PWM pulses are at high level. If the direction-controlling signal is at low level, the driver 3 rotates in a rearward direction as long as the PWM pulses are at high level. The operation of the driver 3 is monitored by a monitor circuit 4.

The above-described limit switches 37 and 38 are inserted in series in the line for energizing the motor 21. These switches limit rotation exceeding the angular limit of the output shaft 32. More specifically, as described previously, forward rotation of the motor 21 is transmitted to the output shaft 32 via the solenoid clutch. The output shaft 32 is rotated in the direction to wind up the wire 42. If this rotation exceeds an angle corresponding to the upper limit of the throttle, the limit switch 37 opens to prevent the motor 21 from rotating forward further. Rearward rotation of the motor 21 is transmitted via the solenoid clutch to the output shaft 32. Then, the output shaft 32 turns in the direction to pay out the wire 42. If the angular position is less than an angle corresponding to the lower limit of the throttle opening, the limit switch 38 opens to prevent the motor 21 from rotating backward. When forward rotation is prevented, rearward rotation is allowed by a diode D1 connected in parallel with the limit switch 37. When rearward rotation is prevented, forward rotation is enabled by a diode D2 connected in parallel with the limit switch 38.

The aforementioned coil 25 of the mechanism electrically driving the throttle valve is connected with a solenoid driver 5. When the driver 5 receives an instruction for energizing the solenoid clutch from the CPU 1, the driver energizes the coil 25. When the driver receives an instruction indicating deenergization of the clutch, it deenergizes the coil.

A normally closed brake switch $BSW_2$ which responds to operation of the brake pedal (not shown) is inserted in the power line connected to the coil 25. When the brake pedal is depressed, the switch $BSW_2$ opens to cut off the power line to the coil 25. Accordingly, when the human driver pushes down on the brake pedal, the coil 25 is immediately deenergized. The operation of the solenoid driver 5 and the brake switch $BSW_2$ is monitored by the monitor circuit 6.

When a lamp driver 7 receives an instruction for energizing the warning lamp from the CPU 1, the driver energizes the warning lamp ALP provided that the constant voltage Vcc2 is supplied. This lamp ALP is installed in the instrument panel (not shown) of the automobile and backlights the message "Please Check Cruise Control."

When an A/D converter 8 is selected by the CPU 1, the converter converts the output voltage from the potentiometer 36 into digital form. This digital signal is supplied back to the CPU 1. When another A/D converter 9 is selected by the CPU 1, the converter 9 converts the output voltage from an F/V converter 10 into digital form and feeds it back to the CPU 1. When a further A/D converter 11 is selected, the output voltage from a tilt sensor 12 is converted into digital form and supplied back to the CPU 1.

The F/V converter 10 converts its input frequency into a corresponding voltage, and a reed switch LSW is connected to the converter 10. The switch LSW is turned on or off, depending on the magnetic field produced by a rotating permanent magnet Mag coupled to the output shaft (not shown) of the transmission. The converter 10 converts the signal produced by the switch LSW into a voltage. That is, the F/V converter 10 produces a voltage proportional to the vehicle speed.

The tilt sensor 12 comprises a pendulum 12a and a potentiometer 12b which are enclosed in a container filled with a damper oil. The potentiometer 12b detects the tilt angle of the pendulum 12a. The sensor is rigidly fixed to the horizontal reference surface of the automobile such that the pendulum swings back and forth. Therefore, if the automobile inclines forwardly or rearwardly while going up or down a hill, the tilt angle is known from the inclination of the pendulum 12a to the vertical.

Input circuits 13, 14, 15, and 16 are input interfaces which ared used to permit the CPU 1 to know whether switches SSW, RSW, $BSW_1$, and CSW are open or closed.

The switch SSW is a manually operated set switch. When this set switch SSW is turned off, the vehicle speed is kep at the speed obtained when the switch SSW is turned off. The switch RSW is a manually operated RESUME switch. When this switch is operated, cruise control is initiated at the speed stored in the memory. If cruise control operation is canceled, the vehicle speed is kept at the speed obtained before the cruise control operation is canceled.

The switch $BSW_1$ is a normally open switch, unlike the brake switch $BSW_2$. When the driver pushes down on the brake pedal (not shown), the switch $BSW_1$ is closed. A brake lamp BLP is connected in series with the switch $BSW_1$. Since the voltage developed across the brake switch $BSW_1$ is applied to the input circuit 15, if the brake lamp BLP or a fuse inserted in series with this lamp breaks, the condition of the brake switch $BSW_1$ can be detected. The switch CSW is a normally open clutch switch which responds to the depression of the clutch pedal (not shown).

The EFI controller 17 forms the essential part of the electronic fuel-injection system. Electronic fuel-injection valves $FIV_1$, $FIV_2$, an input circuit 17a, an amplifier 17b, and various sensors (not shown) are connected with the controller 17. The various sensors (not shown) include a fuel lamp, a pressure sensor, an intake air temperature sensor, and a cooling water temperature sensor. An idling switch ISW and the tachogenerator 17c are connected to the input circuit 17a and the amplifier 17b, respectively.

When energized, the electronic fuel-injection valves $FIV_1$ and $FIV_2$ spray fuel supplied from a fuel pump into a mixing chamber FMC. The idling switch ISW detects the lower limit of the opening of the throttle valve 65. The lower limit corresponds to the idling of the engine E/G. The tachogenerator 17c detects the rotational speed of the engine.

The EFI system is of the speed density type. The EFI controller 17 energizes or deenergizes the electronic fuel-injection valves $FIV_1$ and $FIV_2$ according to the information supplied from the idling switch ISW, the tachogenerator 17c, the pressure sensor, the intake air temperature sensor, and the cooling water temperature sensor. The valves inject fuel at a rate required by the engine. If the idling switch ISW detects the lower limit of the opening of the throttle valve 65, and if the tachogenerator 17c detects a rotational speed of the engine exceeding a predetermined rotational speed, then the supply of fuel is cut off provided that this is allowed by the CPU 1. Thus, the braking force of the engine and the fuel consumption ratio are improved.

An off board diagnostic tool 18 is connected if necessary when repair is made. The tool 18 is equipped with a display device and operated keys to input various instructions and display data supplied from the CPU 1. The supplied data includes data about diagnosis. The various instructions include an instruction for feeding diagnostic data to the CPU 1 and an instruction for canceling abnormal mode.

The operation of the CPU 1 is next described by referring to the flowcharts of FIGS. 2, 3, 4a, 4b, and 4c.

Referring to FIGS. 2 and 3, when the battery BTT is connected into the circuit and the constant voltage Vcc1 is supplied to the CPU 1 from the first regulated power supply $CPS_1$, the CPU 1 initializes input/output ports, internal registers, and a RAM (step 1). The CPU permits the EFI controller 17 to cut off the supply of fuel. Then, the CPU executes an instruction for standby, and the standby mode is set (step 2).

Thereafter, the main switch MSW is turned on so that the higher level of the constant voltage Vcc2 is applied to the control port Iss. As a result, the operation mode goes back to the normal mode from the standby mode. An initial setting subroutine is carried out (step 10).

In the initial setting subroutine, the output ports, various flags excluding an abnormal flag Fab, registers, and a memory excluding memory regions storing a table Pm for setting the initial opening and storing data about diagnosis are initialized. The EFI controller 17 is allowed to cut fuel supply. After the end of the initial setting subroutine, the CPU 1 executes the processing starting with step 11, repeatedly at intervals of about 50 msec.

Input signals are read (step 11). Specifically, the presence or absence of the applied constant voltage Vcc2, the states of the switches SSW, RSW, BSW$_1$, and CSW, the angular position Pp of the output shaft 32 of the mechanism electrically driving the throttle according to the output voltage from the potentiometer 36, the vehicle velocity Vp represented by the output voltage from the F/V converter 10, and the forward or rearward inclination angle Ip of the automobile represented by the output voltage from the tilt sensor 12 are read. Also, the acceleration Ap is calculated from the change in the vehicle velocity. Note that the subscript p indicates that these various values are present values.

Depending on the value held in a selecting register SEL, one of the following operations is selected (step 12). If the value is 0, a standby subroutine is carried out (step 100). If the value is 1, an initial opening setting subroutine is carried out (step 200). If the value is 2, a cruise control subroutine is performed (step 300). If the value is 3, a cancel subroutine is carried out (step 400). The register SEL is initialized at 0 in the initial set subroutine. These subroutines are next described successively from the standby subroutine.

Figure 4A:
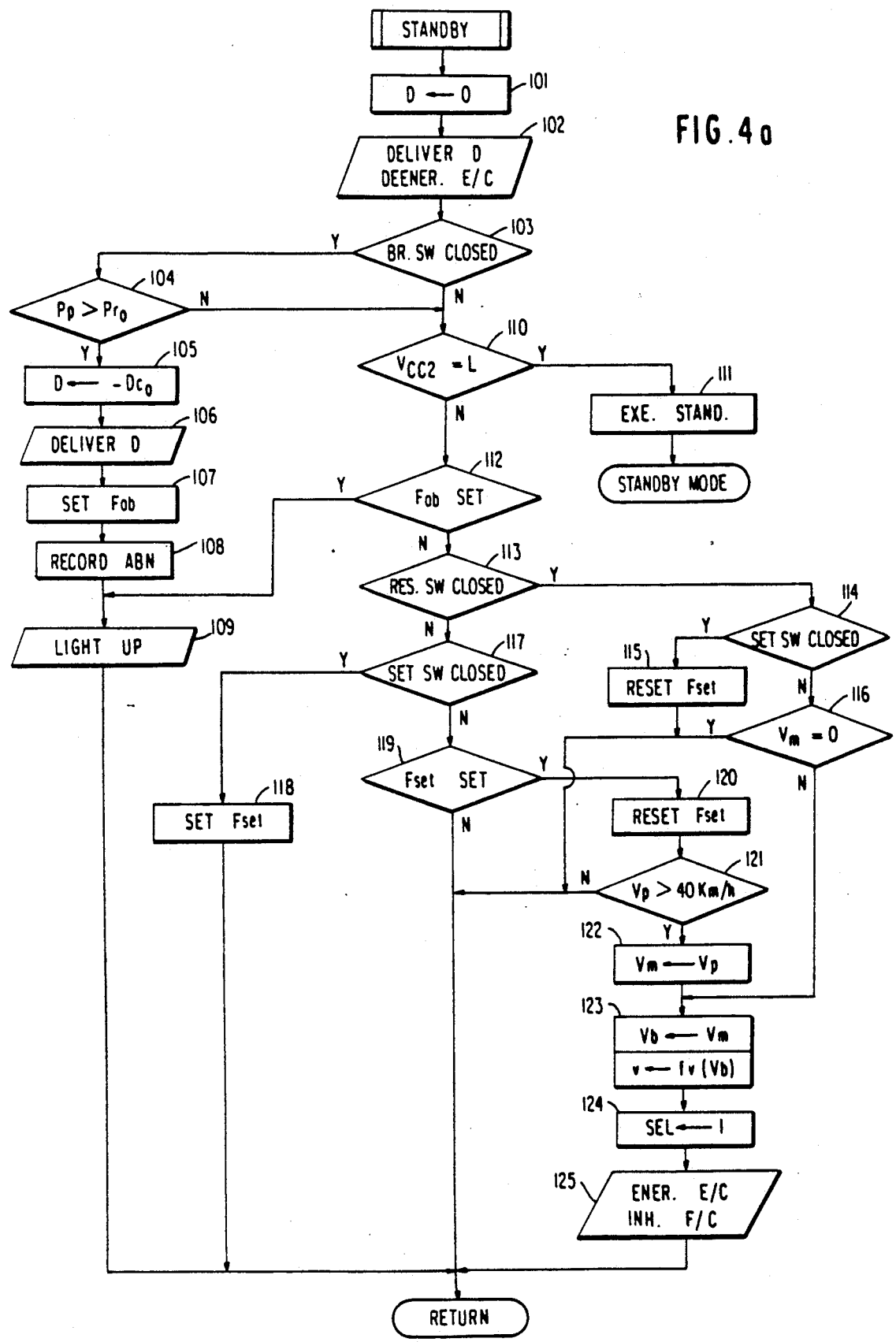
Figure 4B:
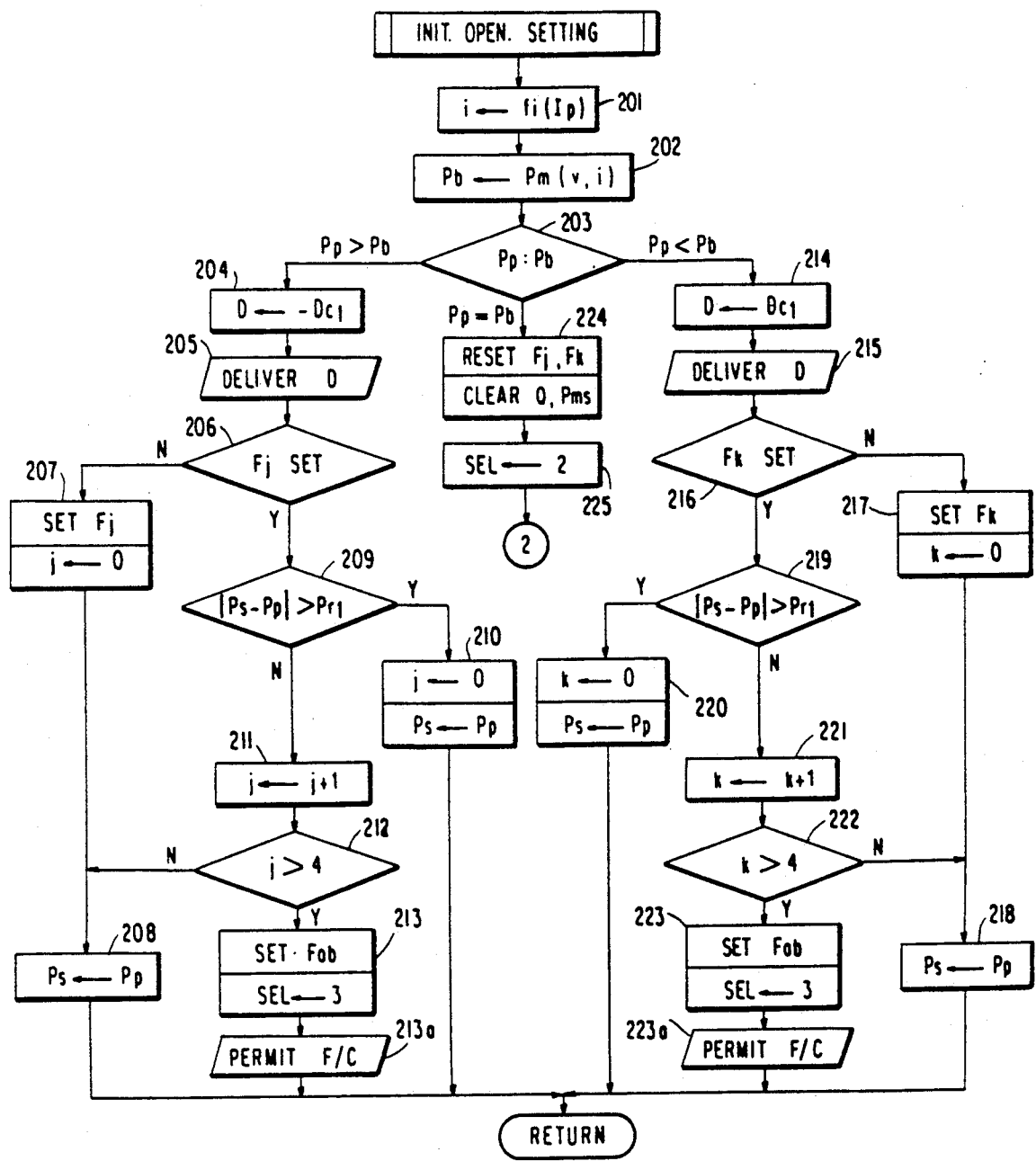
Figure 4C:
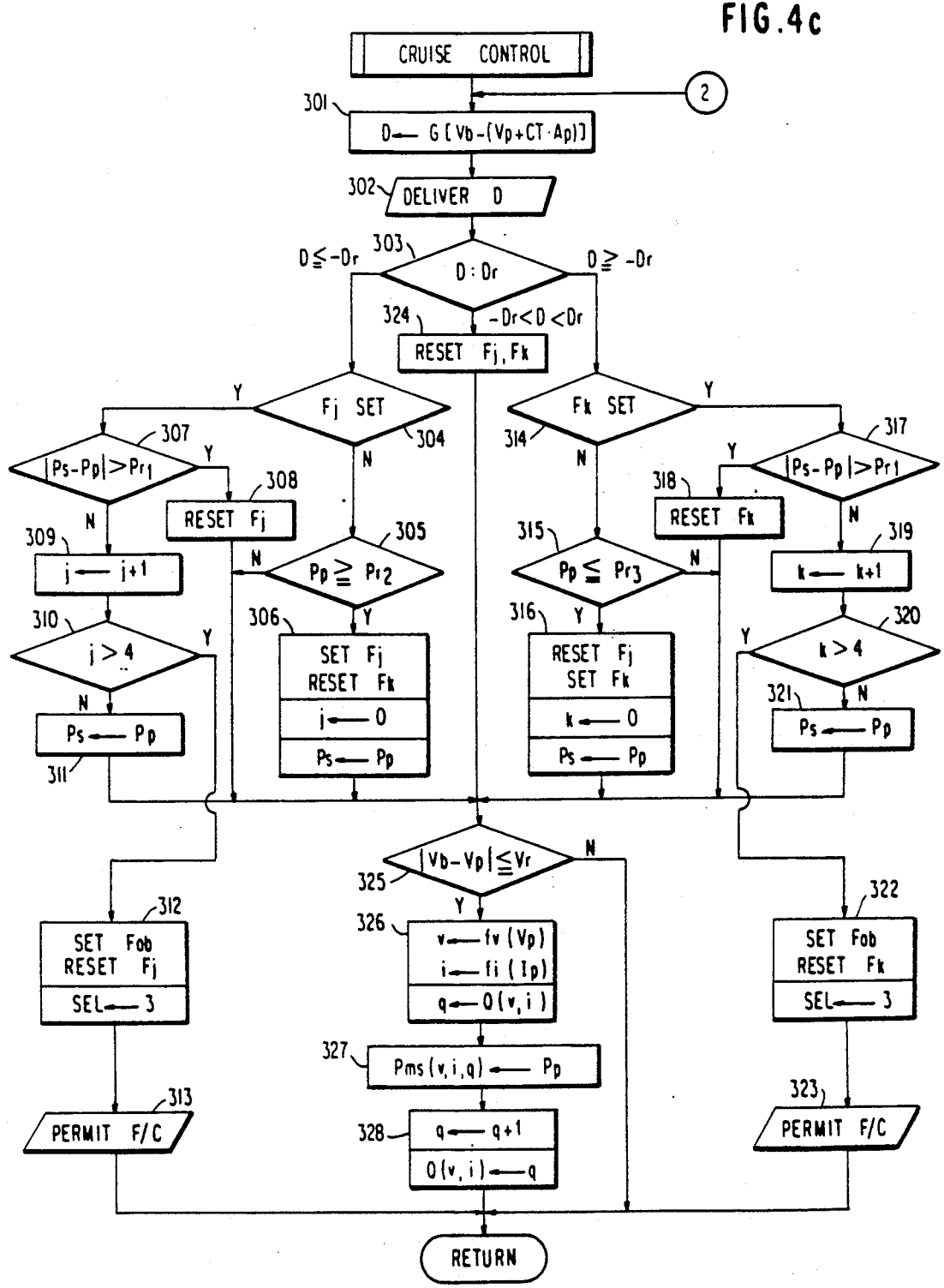

The standby subroutine is now described by referring to FIG. 4a. The PWM data D is set to 0 (step 101) and delivered to the PWM counter 2 (step 102). Also, the solenoid driver 5 is caused to deenergize the solenoid clutch E/C. If the motor driver 3 has energized the motor 21, it is deenergized. If the solenoid driver 5 has energized the coil 25, it is deenergized.

Thereafter, a check is made to see if the brake switch BSW$_1$ is closed or open (step 103). A check is performed to see whether the voltage Vcc2 is applied or not (step 110). Further, checks are done to see whether the abnormal flag Fab is set or reset (step 112), whether the RESUME switch RSW is closed or open (step 113), whether the set switch SSW is closed or open (step 117), and whether a set flag Fset is set or reset (step 119).

If the brake switch BSW$_1$ is closed (step 103), the angular position Pp of the output shaft 32 is read (step 104). As described already, this angular position Pp corresponds to the tilt angle of the throttle valve 65. When the solenoid clutch is energized, the angle must be returned to the idling angle Pr$_0$ through which the output shaft 32 rotates when the first pulley 50 is located at the aforementioned idling angular position. If the angular position Pp of the output shaft 32 exceeds the idling angle Pr$_0$, there is the possibility that the coupling of the solenoid clutch is at fault, and that the clutch-driven plate 28 cannot be disconnected from the clutch plate 26. The PWM data D is set to a high-speed reversion constant $-Dc_0$ (step 105). This constant is delivered to the PWM counter 2 (step 102). The motor driver 3 receiving the PWM pulses from the PWM counter 2 reverses the motor 21 at a high speed. Therefore, if the coupling of the solenoid clutch is at fault, the output shaft 32 is returned to the idling angle Pr$_0$.

If a trouble of this kind takes place, it is desired to totally inhibit the subsequent use of the cruise-control system by setting the abnormal flag Fab (step 107). The generation of a trouble is recorded as data about diagnosis (step 108). The lamp driver 7 is instructed to light up the warning lamp ALP (step 109). Also, the message "Please Check Cruise Control" is displayed. The CPU 1 retains the abnormal flag Fab until it receives an instruction for canceling the abnormal mode from the off board diagnostic tool 18. As long as this flag is set, control goes back to step 109 step 112; control does not proceed to step 113 or subsequent steps. Therefore, the cruise-control system does not substantially operate.

If it is found that the constant voltage Vcc2 is not applied (step 110), control goes to step 111, where an instruction for standby is carried out so that the standby mode may be set.

If it is found that the RESUME switch RSW is closed (step 113), then the set switch SSW is checked (step 114). In the present cruise-control system, simultaneous operation of the RESUME switch RSW and the set switch SSW is inhibited. If it is found that the set switch SSW is closed, the set flag Fset is reset (step 115). Then, control returns to the main routine, and no special operations are performed.

If it is found that only the RESUME switch RSW is closed, the vehicle velocity Vm stored in the memory is checked (step 116). If the cruise-control system is not operated at all during the period which begins when the main switch MSW is closed and ends when the RESUME switch RSW is closed, then the velocity Vm stored in the memory is 0 and so operation of the RESUME switch RSW is meaningless. In this case, control goes directly to the main routine. In the other case, control proceeds to step 123 and subsequent steps, which are described later.

If it is found that the set switch SSW is closed (step 117), the set flag Fset is set (step 118), and control returns to the main routine. Meanwhile, if the set switch SSW is opened, control goes to steps 119, 120, and subsequent steps, since the set flag Fset is set.

The set flag Fset is reset (step 120). The vehicle velocity Vp is checked (step 121). The present cruise-control system cannot be operated below 40 Km/h. If the velocity Vp is in excess of 40 Km/h, the velocity Vp is recorded as the velocity Vm stored in the memory (step 122).

An intended vehicle velocity Vb is set, based on the velocity Vm stored in the memory (step 123). A sequential number v that divides vehicle velocities into plural groups is determined from the intended velocity Vb and from a function $f_v$. This number v is used when the angular position of the output shaft 32 corresponding to the initial opening of the throttle valve 65 is found during the initial opening setting subroutine described below.

Then, the value held in the selecting register SEL is set to 1 (step 124). The solenoid driver 7 is instructed to energize the solenoid clutch (step 125). The EFI controller 17 is ordered to prevent from cutting off the supply of fuel. Then, control returns to the main routine.

In the main routine, the value held in the selecting register SEL is set to 1. Control goes from step 12 to step 200, and the initial opening setting subroutine is carried out. This subroutine is next described by referring to FIG. 4b.

A sequential number i which divides tilt angles into plural group is calculated from the tilt angle Ip of the automobile and from a function $f_i$ (step 201). This number is used together with the sequential number v already obtained to search a table Pm for setting the initial opening (step 202). The angular position of the output shaft 32 corresponding to the initial opening of the throttle valve 65 is stored in the table Pm, together with various values of the vehicle velocity and various values of the tilt angle. The CPU 1 reads the angular position of the output shaft 32 corresponding to the initial opening of the throttle valve 65 which corresponds to the intended vehicle velocity Vp and the tilt angle Ip of the automobile that are specified by the sequential numbers v and i. Also, the intended angular position Pb of the output shaft 32 is set. When the system is shipped from the factory, standard data is stored in the table Pm. As described later, the data is appropriately updated by suitable learning.

The angular position Pp of the output shaft 32 is compared with the intended angular position Pb (step 203). At this time, if the angle Pp exceeds a tolerable range and is larger than the intended angular position Pb, the PWM data D is set to a reversion constant $-Dc_1$ (step 204). The data is sent to the PWM counter 2 (step 205), which then delivers the PWM pulses to the motor driver 3. This driver reverses the motor 21. If the PWM counter 2 or the motor driver 3 is at fault for some cause, or if the motor 21 or the transmitting mechanism is locked, the output shaft 32 does not rotate. Accordingly, troubles of this kind are detected at steps 206–212 as described below.

A count flag Fj is checked (step 206). If this flag is reset, it is set (step 207). A count register j is cleared and then the angular position Pp of the output shaft 32 obtained at this time is recorded as an angular position Ps obtained before the motor 21 is energized (step 208). Then, control goes back to the main routine.

Since the count flag Fj is set at this time, if the initial opening setting subroutine is next carried out, control proceeds to step 209 from step 206. The change in the angular position of the output shaft 32 which is caused during one processing cycle, i.e., $|Ps-Pp|$, is checked (step 209). If the difference $|Ps-Pp|$ is in excess of a threshold value $Pr_1$, the CPU sees that the output shaft 32 is rotating without trouble. Control proceeds to step 210, where the count register j is cleared. The angle Ps obtained before energization is updated, and then control returns to the main routine. If the difference $|Ps-Pp|$ is less than the threshold value $Pr_1$, then the rotation of the output shaft 32 is regarded as abnormal. Control goes step 211, where the count register j is incremented. The angle Ps is updated (step 208). Control then returns to the main routine.

If the rotation of the output shaft 32 is regarded as abnormal for four successive cycles, then the value held in the count register j exceeds 4. If so, the abnormal flag Fab is set (step 213). The value held in the selecting register SEL is set to 3, and reservations are made to select the cancel subroutine. The EFI controller 17 is permitted to cut the supply of fuel (step 213a). The cancel subroutine is described later.

The angular position Pp of the output shaft 32 is compared with the intended angular position Pb (step 203). If the position Pp plus the tolerable range is less than the position Pb, the motor 21 is rotated in a forward direction while monitoring the change in the angular position of the output shaft 32 (step 214 and the subsequent steps). These steps are similar to the aforementioned steps 204–213a except that the reversion constant $-Dc_1$, the count flag Fj, the count register Fj are replaced by a forward rotation constant $Dc_1$, a count flag Fk, and a count register k, respectively. Therefore, these processings are not described herein.

The angular position Pp of the output shaft 32 is compared with the intended angular position Pb (step 203). If they agree within a permitted range, then the count flags Fj and Fk are reset (step 224). Also, an address table Q and an initial opening updating table Pms (described later) are cleared. The value held in the selecting register SEL is set to 2 (step 225). Subsequently, the cruise-control subroutine is described by referring to FIG. 4c.

The following calculation is performed (step 301):

$$G\{Vb-(Vp+CT\cdot Ap)\} \qquad (1)$$

where G is a predetermined loop gain, Vb is the intended vehicle velocity, Vp is the vehicle velocity at that time, CT is a predetermined compensating time constant, and Ap is the acceleration obtained at that time. The time constant CT compensates for the lag of the vehicle velocity change relative to the change of the opening of the throttle valve 65. Thus, the PWD data D is determined and sent to the PWM counter 2 (step 302). In this way, the PWM counter 2 delivers the PWM pulses to the motor driver 3, which rotates the motor 21 forwardly or rearwardly. If the PWM data D has a certain magnitude, in the present example in excess of the threshold value Dr, then the rotation of the motor 21 produces a noticeable change in the angular position of the output shaft 32 provided that none of the PWM counter 2, the motor driver 3, the motor 21, and the transmitting mechanism are at fault, except where the angle of the output shaft 32 is excess of the angle corresponding to the upper limit of the throttle opening or lower than the angle corresponding to the lower limit. In other words, if any trouble of this kind takes place, no change in the angular position of the output shaft 32 can be detected. Steps 304–312 are performed to detect any trouble of this kind when reversion of the motor 21 is determined by producing the PWD data D to the PWM counter 2, the magnitude of the data D being in excess of the threshold value Dr. Steps 314–322 are carried out to detect any trouble of this kind when forward rotation of the motor 21 is determined.

The count flag Fj is checked (step 304). If this flag is reset, the angular position Pp of the output shaft 32 obtained at that time is checked (step 305). If the angular position Pp is less than the lower limit of the angular position $Pr_2$ which is set, based on the angle corresponding to the upper limit of the throttle opening, then control directly goes to step 325. If it is in excess of $Pr_2$, the count flag Fj is set and the count flag Fk is reset (step 306). The count register j is cleared. The angular position Pp of the output shaft 32 derived at this time is recorded as the angular position Ps prior to rotation, and then control proceeds to step 325.

Since the count flag Fj is set at this time, when the cruise-control subroutine is carried out next, control goes to step 307 from step 304. Step 307 is equivalent to step 209 or 219 of the aforementioned initial opening setting subroutine and carried out to know the change in the angular position of the output shaft 32, or the degree of $|Ps-Pp|$, during one cycle of operation. If the difference $|Ps-Pp|$ is in excess of the threshold value $Pr_1$, then the rotation of the output shaft 32 is regarded as normal. Control goes to step 308, where the count flag Fj is reset. If the difference $|Ps-Pp|$ is less than the threshold value $Pr_1$, then the rotation of the output shaft 32 is regarded as abnormal. Control then proceeds to step 309, where count register j is incremented. The angular position Ps prior to the rotation is updated (step 311).

While the PWM data D exceeding Dr is being delivered to reverse the motor 21, if the rotation of the output shaft 32 is regarded as abnormal for more than 4 successive cycles of operation, the value held in the count register j exceeds 4. In this case, the abnormal flag Fab is set, and the count flag Fj is reset (step 312). The value held in the selecting register SEL is set to 3, and reservations are made for the cancel subroutine. The EFI controller 17 is enabled to cut the supply of fuel (step 313), and then control returns to the main routine.

Steps 314–323 are similar to steps 304–313 except that the count flag Fj, the count flag Fk, the count register j, and the lower limit of the angular position $Pr_2$ are replaced with count flag Fk, count flag Fj, count register k, and the upper limit of the angular position $Pr_3$, respectively, and that the sense of the inequality used at step 315 corresponding to step 305 is reversed. Therefore, the steps 314–323 are not described herein.

If the PWM data D that is set at step 301 and delivered to the PWM counter 2 at step 302 is not in excess of the threshold value Dr, then the count flags Fj and Fk are reset (step 324). Then, control goes to step 325.

The difference between the present vehicle velocity Vp and the intended velocity Vb is calculated (step 325). If this difference is less than a tolerable range Vr, then the opening of the throttle value 65 is regarded as being substantially precisely reflected in the vehicle velocity. An initial opening updating table Pms for updating the data in the initial opening setting table Pm is created (step 326 and the subsequent steps). More specifically, the sequential number v dividing various values of the vehicle velocity into plural groups is searched, using the vehicle velocity Vp and the function $f_v$. The sequential number i dividing various values of the tilt angle into plural groups is searched, using the tilt angle Ip of the automobile and a function $f_i$. Also, an address table Q is searched, using the numbers v and i (step 326). The address q of the vacant region in the initial opening updating table Pms specified by the sequential numbers v and i are found. The angular position Pp of the output shaft 32 obtained at that time is stored in the region Pms (v, i, q) in the initial opening updating table Pms specified by the sequential numbers v, i, and the address q (step 327). Thereafter, the address q is updated and written into the region Q (v, i) of the address table Q which is specified by the numbers v and i (step 328). Then, control returns to the main routine.

Referring again to FIG. 3, in the loop for executing the initial opening setting subroutine and also in the loop for executing the cruise-control subroutine, the presence or absence of the voltage Vcc2 (step 13), the condition of the brake switch $BSW_1$ (step 14), and the condition of the clutch switch CSW (step 13) are monitored. If the voltage Vcc2 is not applied, and if either the brake switch $BSW_1$ or the clutch switch CSW is closed, the value held in the selecting register SEL is set to 3 (step 16) for making reservations for the cancel subroutine. The EFI controller 17 is permitted to cut off the supply of fuel (step 17).

Figure 4D:
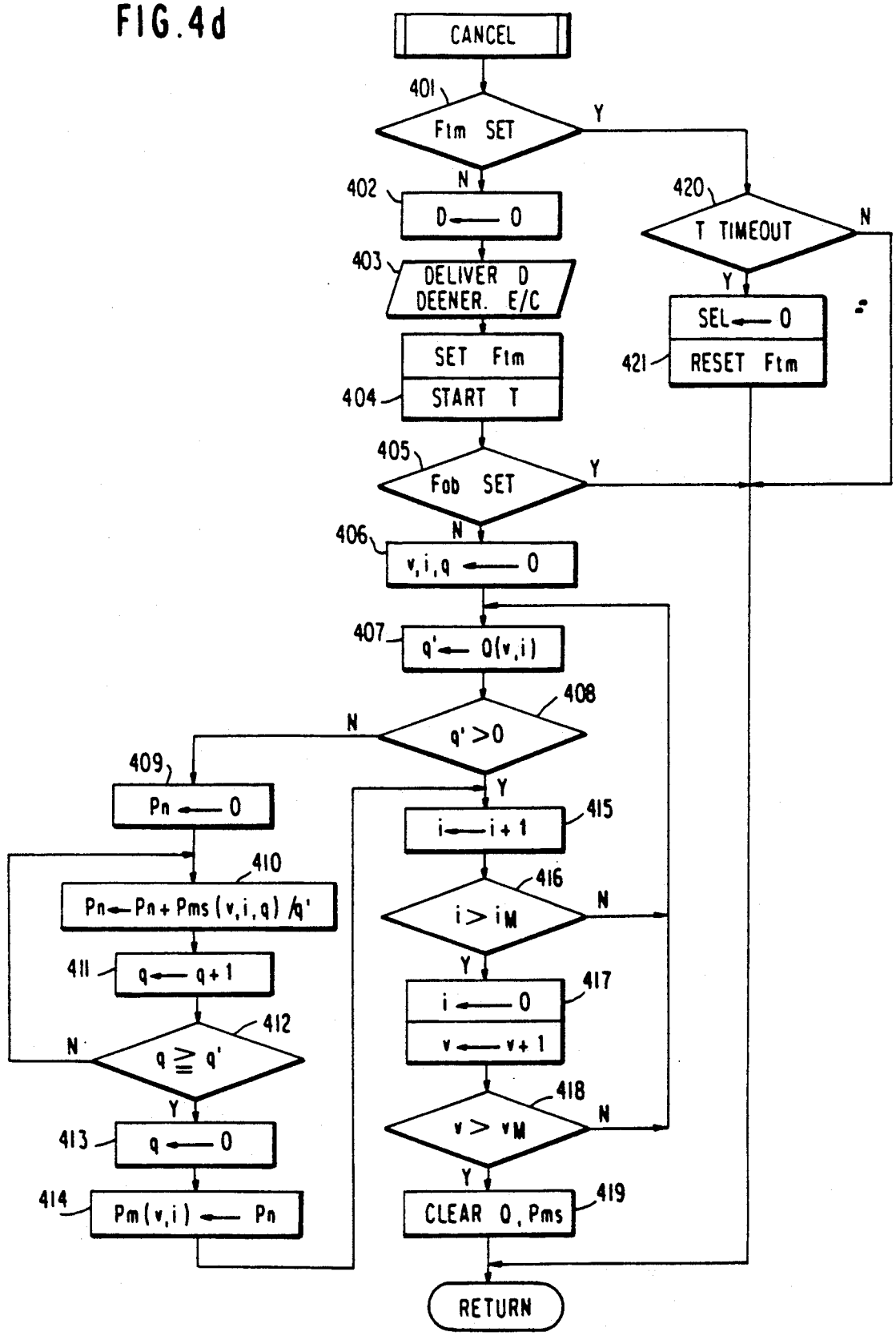

The cancel subroutine is next described by referring to FIG. 4d. A timer flag Ftm is checked (step 401). If the cancel subroutine is first carried out, then the timer flag Ftm has been reset. The PWM data D is set to 0 (step 401) and sent to the PWM counter 2 (step 403). Also, the solenoid driver 5 is instructed to deenergize the solenoid clutch. The timer flag Ftm is set, and a timer T is cleared and started (step 404).

Subsequently, the data in the initial opening setting table Pm is updated, based on the data in the initial opening updating table Pms created in the cruise-control subroutine. If any trouble occurs before the execution of the cancel subroutine, the data in the initial opening updating table Pms is regarded as unreliable, and the data in the table Pm is not updated. That is, the abnormal flag Fab is checked (step 405). If this flag is set, control returns to the main routine without carrying out the subsequent processing.

The sequential numbers v, i, and the address q are initialized (step 406). The address q' of the vacant region of the initial opening updating table Pms specified by the sequential numbers v and i is found from the address table Q (step 407). This address q' corresponds to the number of updating data items written in the column of the table Pms specified by the sequential numbers v and i. If the value exceeds 0, control goes to step 408 and then to step 409. An updating register Pn is cleared. The average of all the updating data in the column of the initial opening updating table Pms specified by the sequential numbers v and i is calculated and held in the updating register Pn (steps 410–412). The address q is again initialized (step 413). The average value held in the updating register Pn is transferred into the region Pm (v, i) of the initial opening setting table Pm specified by the sequential numbers v and i (step 414).

These steps 407–414 are performed whenever the sequential number i is updated (step 415). When the sequential number i is cycled through all the numbers, the sequential number v is updated (step 417). Then, the process is repeated, and the initial opening updating setting table Pm is updated.

After finishing the renewal of the table Pm, the address table Q and the initial opening updating table Pms are cleared (step 419). Then, control goes back to the main routine.

When the cancel subroutine is carried out again, the timer flag Ftm has been set. Control goes to step 420 from step 401, and the timer T is monitored. This timer is employed to afford the time sufficient for the first pulley 50 of the connecting mechanism 100 (FIG. 5c) to be returned to its idling position by the coil spring 53. When the timer generates a timeout signal, the value held in the selecting register SEL is set to 0 (step 421). The timer flag Ftm is reset. Control then returns to the main routine.

In the main routine, if the value held in the selecting register SEL is set to 0, then the aforementioned standby subroutine is effected.

At step 18 of the main routine, processings are carried out when monitor circuits 4 and 6 detect any trouble. Also, processings are performed when the off board diagnostic tool 18 is connected. Since they are not essential to the gist of the invention, they are not described in detail herein. Also note that the configuration of the actuators, sensors, etc. of the above example should not be construed as limiting the present invention.

Figure 6:
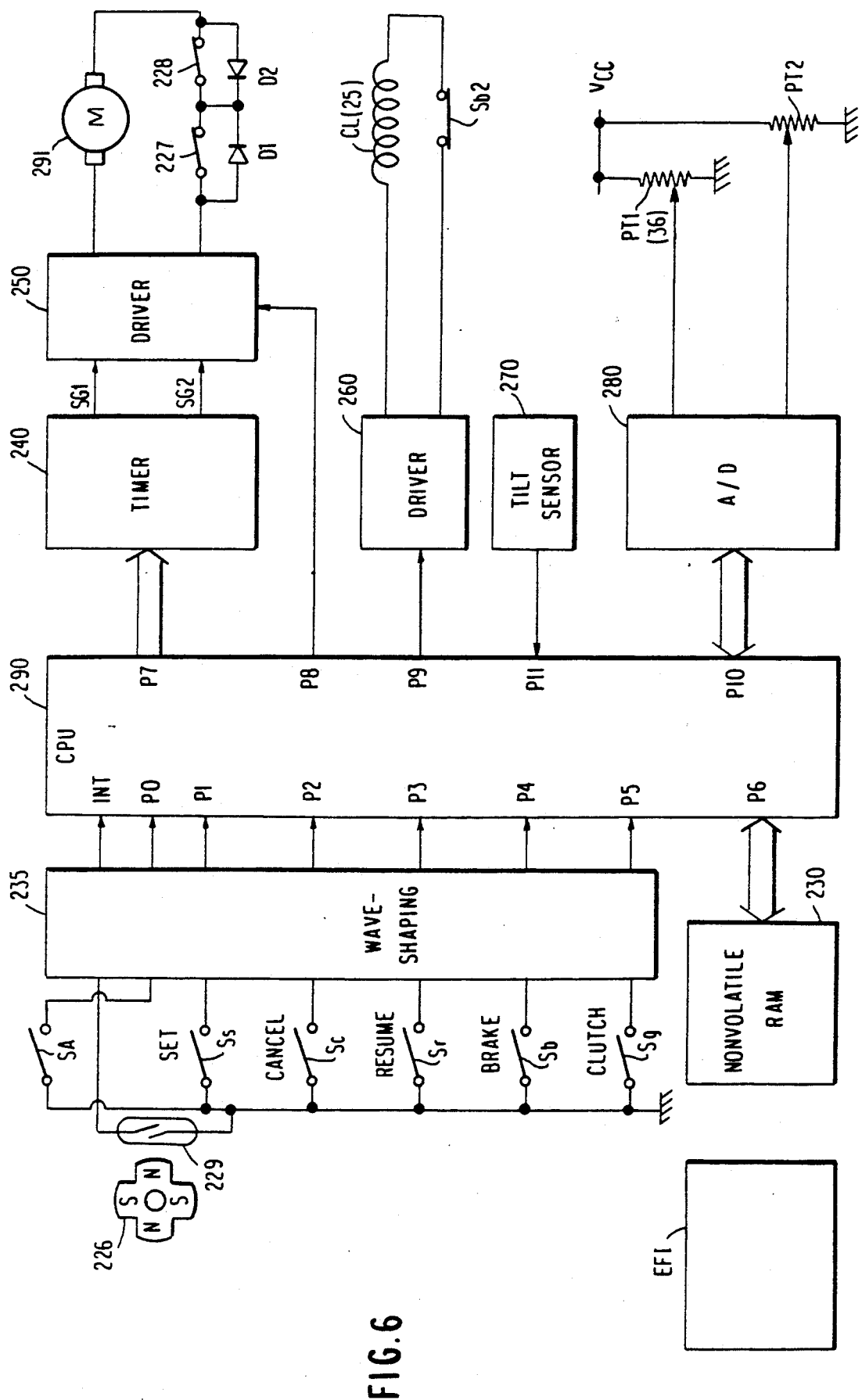
FIG. 6 is a block diagram of electrical equipment mounted on another cruise-control system according to the invention.

Referring next to FIG. 6, there is shown electrical equipment mounted on a vehicle. The equipment includes an electric motor 291 having two terminals which are connected with a driver 250 via limit switches 227 and 228, respectively. Diodes D1 and D2 are connected in parallel with the limit switches 227 and 228, respectively.

Usually, the limit switches 227 and 228 are open. When the limit switch 227 is activated, or opened, flow of electric current in one direction is blocked by the diode D1 to prevent the motor from being energized beyond its limit position. However, electric current can flow through the diode D1 in the opposite direction and so the motor 209 can be reversed. When the limit switch 228 is activated, or opened, electric current flowing in a direction opposite to the foregoing direction is blocked by the diode D2 to prevent the motor 291 from being energized beyond its limit position. Also in this case, electric current flowing in the opposite direction flows through the diode D2. Therefore, the motor 291, which is a DC motor, can be reversed.

Two electrical signals SG1 and SG2 are applied to two input terminals of the driver 250. Each of these two signals can take either a high level or a low level. Depending on the combination of the levels of the two signals SG1 and SG2, an energizing current is supplied to the motor 291 to rotate it clockwise, an energizing current is fed to the motor to rotate it counterclockwise, the terminals are interconnected to brake the motor, or the terminals are disconnected from each other to prevent the motor from being energized. The driver 250 has a further input terminal which is used to allow and inhibit energization.

In this example, the duty cycle of the input signal to the motor 291 is adjusted to controllably energize the motor. A hardware timer 240 is utilized to generate the signals SG1 and SG2 indicating the energization times corresponding to duty cycles. The timer 240 incorporates two independent programmable timers that operate under the control of a microcomputer 290.

An electrical coil CL which is similar to the clutch coil 25 shown in FIG. 5b is connected with a solenoid driver 260 via a brake switch Sb2 that is activated in response to the operation of the brake pedal of the automobile.

A tilt sensor 270 produces an electrical signal which can assume two levels to indicate whether the longitudinal direction of the automobile is substantially horizontal or not. The output terminal of the sensor is connected with an input port P11 of the microcomputer 290.

A potentiometer PT1 for detecting the opening of the actuator shown in FIGS. 5a and 5b and another potentiometer PT2 are connected with the microcomputer 290 via an A/D converter 280. The potentiometer PT1 is the same as the potentiometer 36 shown in FIG. 5a. The potentiometer PT2 is directly connected with the throttle valve and detects the opening. The opening of the actuator and the opening of the throttle valve are detected as analog voltages and converted into digital form, which is applied to the microcomputer 290.

In this example, a nonvolatile RAM 230 which is connected to the microcomputer 290 is provided to preserve requisite data when the power supply of the apparatus is turned off.

A reed switch 229 is mounted close to a rotor 226 made of a permanent magnet. The rotor 226 is coupled to the speedometer cable (not shown). Thus, the reed switch 229 opens and closes at intervals corresponding to the vehicle velocity, and delivers pulses having a period corresponding to the vehicle velocity. The pulses are applied to an interrupt input terminal INT of the microcomputer 290 via a wave-shaping circuit 235.

A switch SA is connected with one input terminal of the wave-shaping circuit 235 to switch the operation mode to a mode in which parameters used for the control system are learned as described later.

The other switches connected to the other input terminals of the wave-shaping circuit 235 are known and so they are described briefly. While a set switch Ss is being depressed, the actuator is driven so as to reduce the vehicle velocity, or to control the throttle opening. The velocity obtained when the switch Ss is opened is stored in the memory as an intended velocity. Then, the operation mode is switched to cruise-control mode. A cancel switch Sc is used to cancel the cruise-control mode. While a RESUME switch Sr is being depressed, the actuator is so driven as to increase the automobile velocity, and the throttle opening is controlled. The velocity derived when the RESUME switch is opened is stored in the memory as an intended velocity. Then, the operation mode is switched to the cruise-control mode. When the driver pushes down on the brake pedal of the automobile, a brake switch Sb is closed to cancel the cruise-control mode. When the driver presses down on the clutch pedal of the automobile, a clutch switch Sg is closed to cancel the cruise-control mode. In this example, the automotive engine is equipped with a known electronic fuel-injection (EFI) system.

Figure 7B:
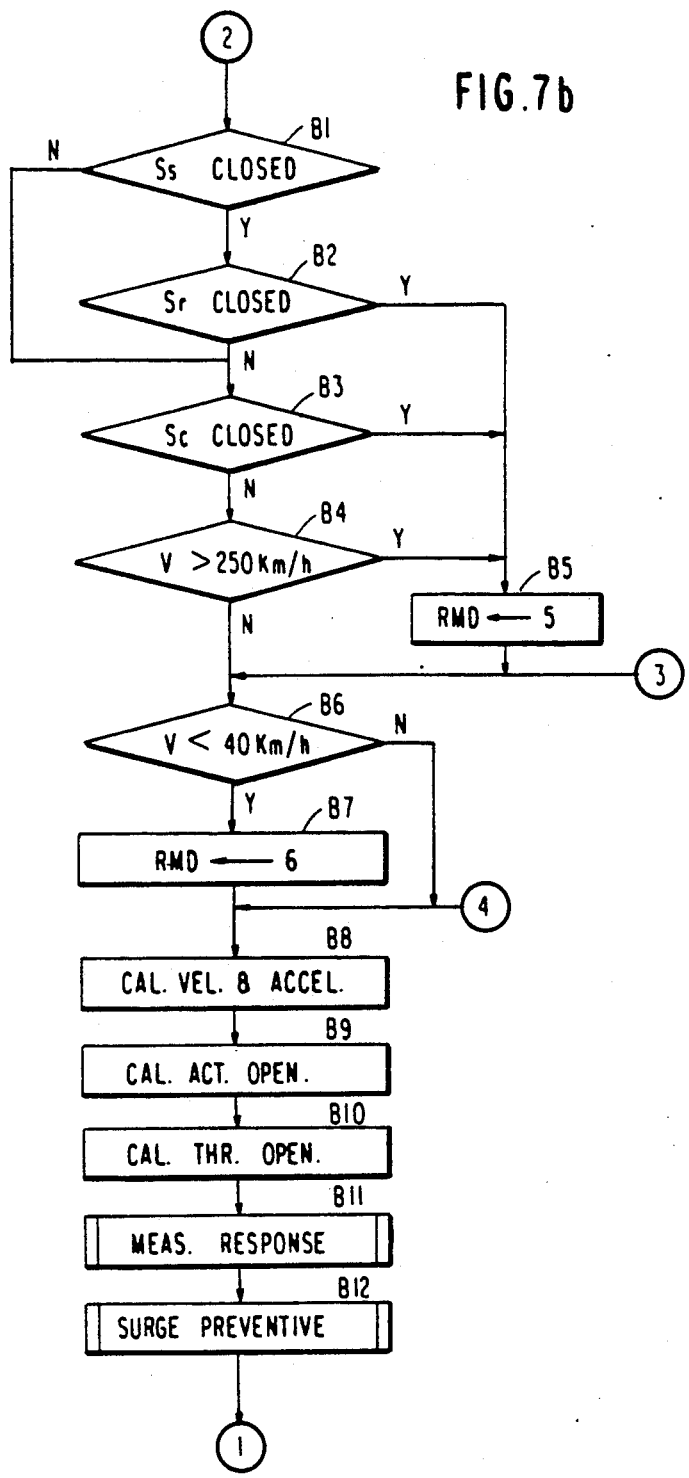

The operation of the cruise-control system is next described in detail. The operation of the microcomputer 290 is illustrated in FIGS. 7a, 7b, 7c, 7d, 7e, 7f, 7g, 7h, 7i, 7j, 7k, 7l, 7m, and 7n. The main routine is illustrated in FIGS. 7a and 7b.

Referring to FIG. 7a, when the power supply is turned on, control goes to step A1, where the system is initialized. Specifically, the internal memory is cleared. The output ports are set to their initial states. The internal timer is set up. Various interrupt permitting flags are set. Parameters are initialized. The mode of the timer 240 is set. The mode of the A/D converter 280 is set, and other operations are performed.

The conditions of the switches connected to various input ports and the output data from the A/D converter are read (step A2).

The data that was read at step A2 is processed (step A3). The states of various switches are read. If the condition of any switch changes, a corresponding operation is performed. For example, various software timers (described later) for measuring the times for which switches are operated are cleared.

The mode in which the apparatus operates is read at steps A4, A5, A6, A7, A8, and A9. A mode register RMD retains the value of the operation mode. When this value is 0, a standby subroutine (step A10) is carried out, and then control goes to step A17. When the value is 1, a Full ON mode subroutine (step A11) is executed, and then control proceeds to step A17. When the value is 2, a cruise-control mode subroutine (step A12) is performed, and then control goes to step A17.

When the value is 3, an accelerate mode subroutine (step A13) is carried out, and then control proceeds to step A19. When the value is 4, a coast down mode subroutine (step A14) is performed, and then control goes to step B1 (FIG. 7b). When the value is equal to 5, a cancel mode subroutine (step A15) is carried out, and then step B6 (FIG. 7b) is performed. In the other case, a lower limit mode subroutine (step A16) is effected, and then control goes to step B8 (FIG. 7b). These subroutines are described in detail later.

At step A17, the contents of a register TMR2 which is used as a software timer are read. This register retains the time for which the RESUME switch Sr is closed. If it is found that the switch Sr is closed (step A3), then the register TMR2 is cleared and begins to count.

If the time for which the RESUME switch Sr is closed persists for more than 0.5 second, control goes to step A18 from step A17. Value "3" is stored in the mode register RMD, and then control goes to the accelerate mode.

At step A19, a check is performed to see whether the detected present vehicle velocity is lower than the intended velocity stored in the memory by more than 25 Km/h. If so, "5" is stored in the register RMD, and control goes to the cancel mode.

At step A21, the condition of the set switch Ss is checked.

If the set switch Ss is closed (step A21), control goes to step A22, where "4" is stored in the mode register RMD.

Referring next to FIG. 7b, if the set switch Ss and the RESUME switch Sr are closed, then steps B1, B2, and B5 are carried out in this order. Then, "5" is stored in the register RMD. Control proceeds to the cancel mode.

If the cancel switch Sc is closed, control goes from step B3 to step B5 to carry out the cancel mode. If the present velocity V is in excess of the higher limit of 250 Km/h, then control goes from step B4 to step B5, and the cancel mode subroutine is effected.

If the present velocity V of the vehicle is less than the lower limit of 40 Km/h, then control goes from step B6 to step B7, where "6" is stored in the mode register RMD. Then, control shifts to the lower limit mode.

At step B8, the vehicle velocity and the acceleration are calculated. An external interruption (not shown) is caused at the leading edge of a pulse signal that is produced from the reed switch 229 to indicate the vehicle velocity. In this interruption, the period of the pulses is measured to determine the vehicle velocity. The acceleration is derived by calculating the velocity change per unit time.

At step B9, the opening of the actuator is calculated from the information about the opening, the information being supplied from the potentiometer PT1.

Similarly, the opening of the throttle valve is calculated from the information regarding the opening, the information being obtained from the potentiometer PT2 (step B10).

After completing step B10, a response characteristic measuring subroutine (step B11) and a surge preventive subroutine (step B12) are carried out. Then, control returns to step A2 (FIG. 7a), and the above-described processings are repeated.

Figure 7C:
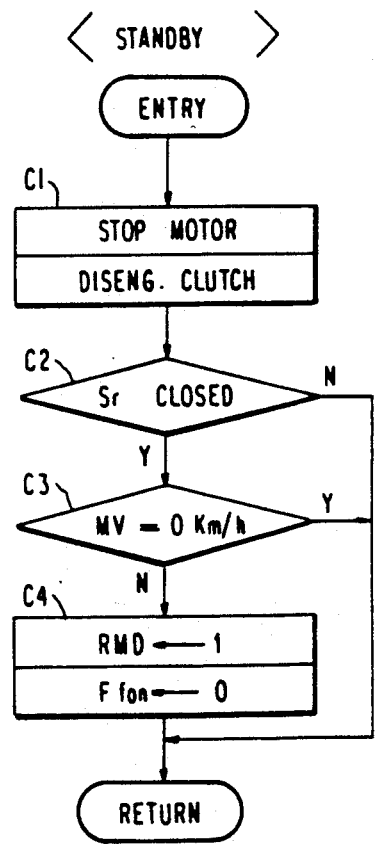

The contents of the standby subroutine (step A10) is illustrated in FIG. 7c, where the electric motor 291 is stopped, and the clutch is disengaged (step C1). In this condition, the actuator is released and so the opening of the throttle valve is set according to the distance traveled by the accelerator pedal 77.

The condition of the RESUME switch Sr is checked (step C2). The stored vehicle velocity MV is checked (step C3). If the stored vehicle velocity is not cleared, the RESUME switch Sr is closed to carry out step C4, where "1" is stored in the mode register RMD. Then, control goes to Full ON mode, where a flag Ffon is reset.

Figure 7I:
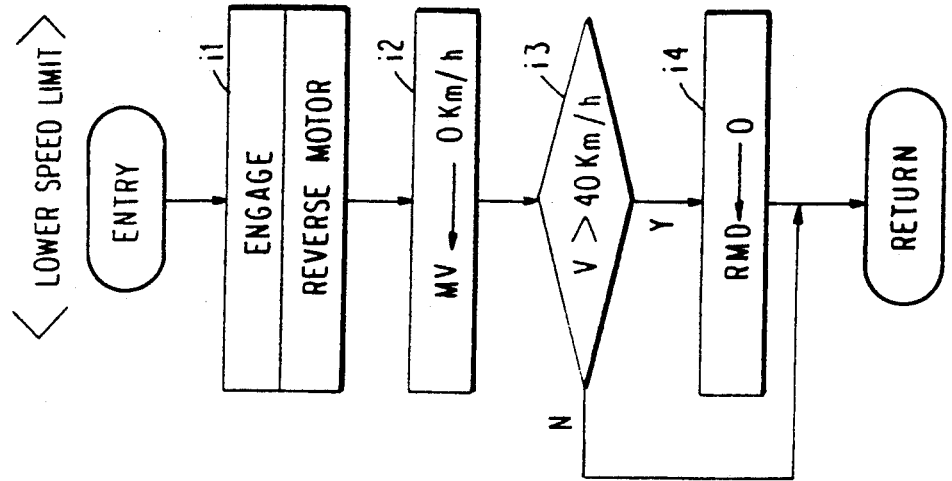
Figure 7H:
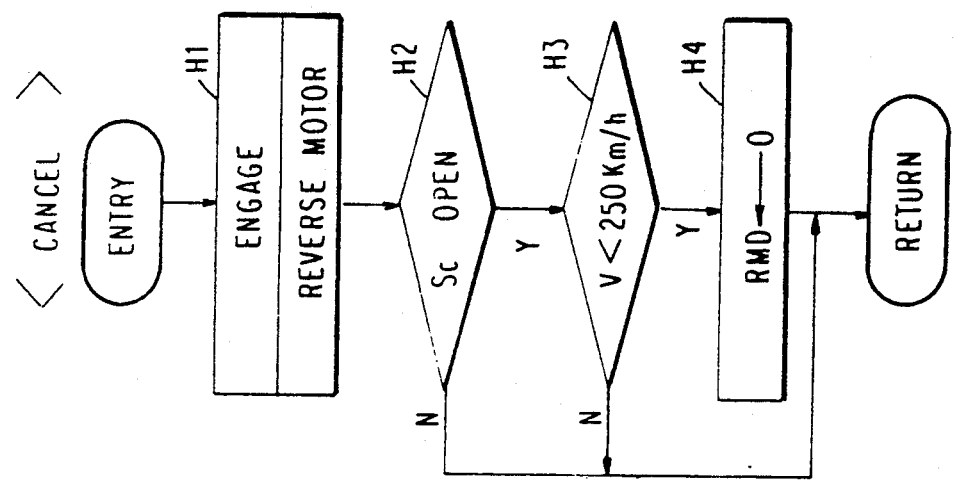
Figure 7G:
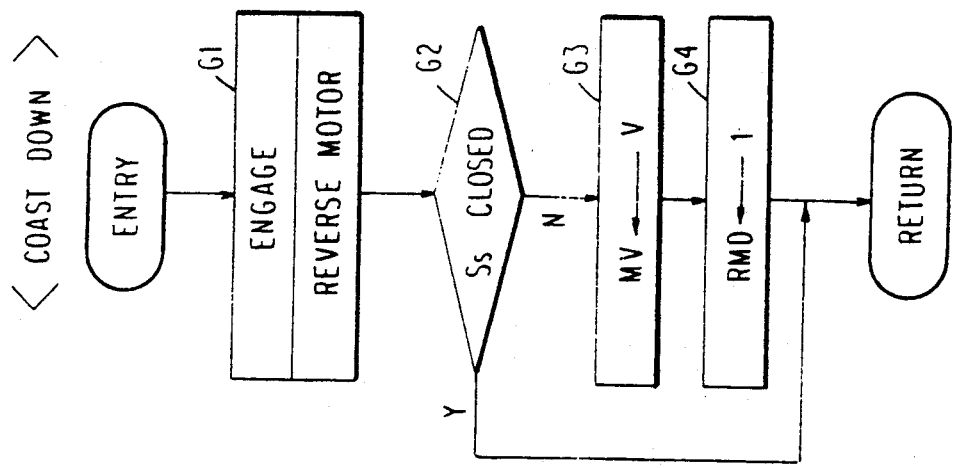
Figure 7D:
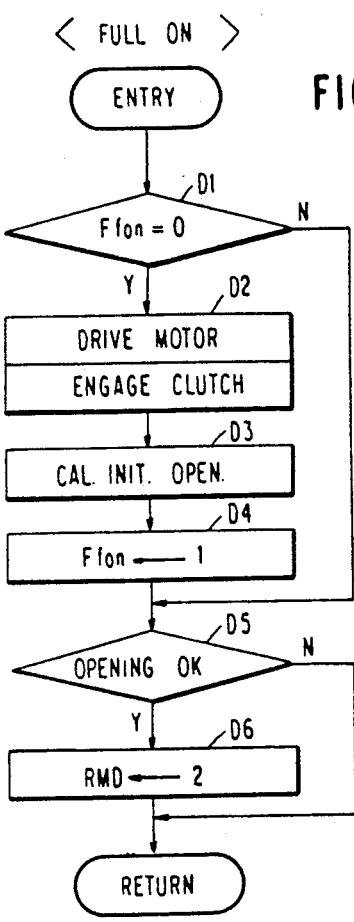

The contents of the Full ON mode subroutine (step A11) is illustrated in FIG. 7d, where the flag Ffon is checked (step D1).

If the flag Ffon is 0, the electric motor 291 is rotated in a forward direction (step D2), and the clutch is engaged. In this state, the actuator is driven at a relatively high speed to gradually increase the throttle opening. Then, control goes to step D3, where the initial opening is calculated. The opening of the actuator corresponds to the intended vehicle velocity MV stored in the memory. Subsequently, the flag Ffon is set (step D4).

A check is performed to see if the opening of the actuator has reached the initial opening calculated at step D3 (step D5). If so, control proceeds to step D6, where "2" is stored in the mode register RMD. That is, the Full ON mode is completed, and then control proceeds to the cruise-control mode in which the vehicle velocity is automatically maintained at the intended velocity.

Figure 7E:
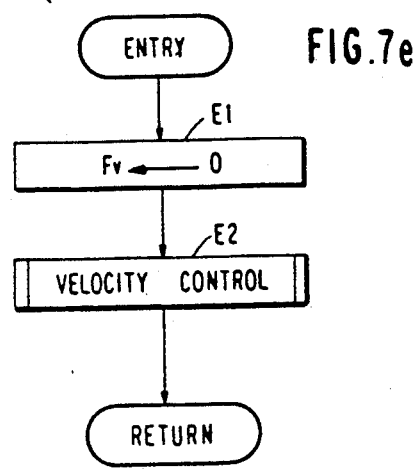

In the cruise-control mode of step A12 shown in FIG. 7a, a flag Fv is reset as illustrated in FIG. 7e, and a velocity control subroutine is carried out. This subroutine will be described later.

Figure 7F:
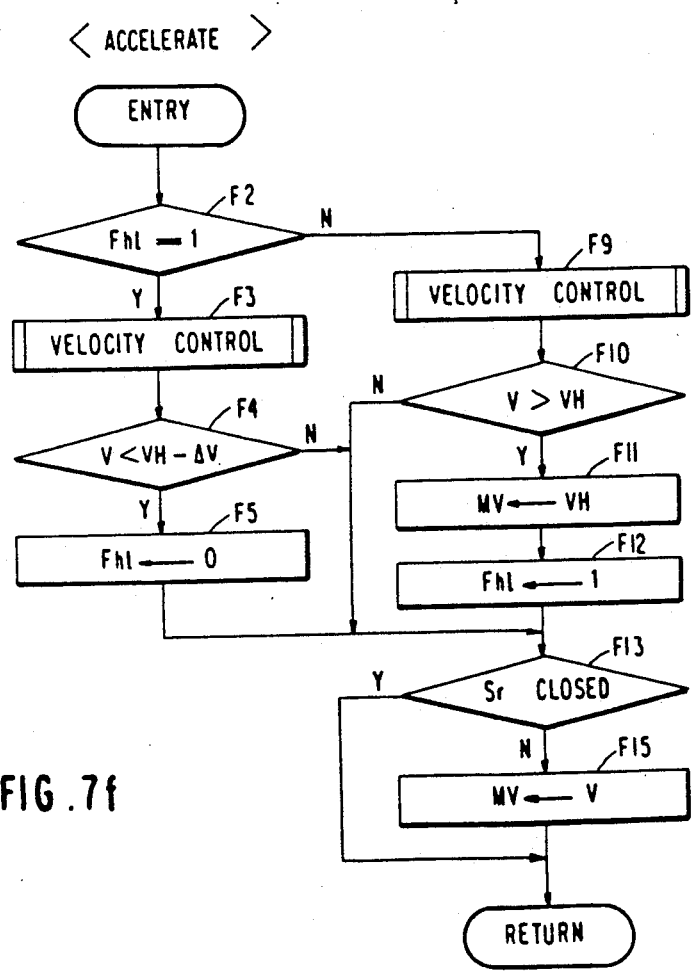

The contents of the accelerate mode subroutine (step A13 of FIG. 7a) are illustrated in FIG. 7f, where a flag Fh1 is checked (step F2). The flag Fh1 is set when the vehicle velocity exceeds the higher limit VH of 250 Km/h.

If the flag Fh1 is set, control goes to step F3, where the velocity control subroutine is carried out. Then, a check is performed to see whether a higher speed limiting operation can be canceled (step F4). Specifically, if the present velocity V is lower than the higher limit velocity VH by $\Delta V$, say 5 Km/h, then control goes to step F5, where the flag Fh1 is reset.

If the flag Fh1 is reset, control goes from step F2 to step F9, where the velocity control subroutine is carried out. Then, control proceeds to step F10, in which the current velocity V is compared with the higher limit VH of the velocity. If the current velocity V is greater than VH, then control goes to step F11, where the higher limit VH is used as the intended vehicle velocity MV, and the flag Fh1 is set.

The condition of the RESUME switch Sr is checked (step F13). If the switch Sr is opened, control goes to step F15, where the present vehicle velocity is stored as an intended vehicle velocity MV.

The contents of the coast down mode (step A14 of FIG. 7a), the cancel mode (step A15), and the lower speed limiting mode (step A16) are illustrated in FIGS. 7g, 7h, 7i, respectively. The contents of these subroutines are next described by referring to these figures.

In the coast down mode subroutine, the clutch is engaged (step G1). The electric motor 291 is reversed by fully energizing it. Therefore, the actuator is driven at a comparatively high speed. This gradually reduces the opening of the throttle, thus gradually reducing the vehicle velocity. If the set switch is opened, control goes from step G2 to step G3, where the present vehicle velocity V is stored in the memory as an intended velocity. Value "1" is then stored in the mode register RMD (step G4), followed by execution of the Full ON mode.

In the cancel mode subroutine, the clutch is engaged (step H1). The motor 291 is reversed by fully energizing it. Thus, the opening of the actuator decreases at a relatively high speed. If the cancel switch Sc is opened, and if the present vehicle velocity is lower than the higher limit of the vehicle velocity, steps H2, H3, and H4 are carried out in this order. Value "0" is stored in the mode register RMD, and then control proceeds to the standby mode.

In the lower speed limiting mode subroutine, the clutch is engaged (step i1). The motor 291 is reversed by electrically fully energizing it. As a result, the opening of the actuator decreases at a relatively high speed. The intended vehicle velocity MV is cleared (step i2). If the present vehicle velocity V is in excess of the lower limit of 40 KM/h, then control goes from step i3 to step i4, where "0" is stored in the mode register RMD. Control then proceeds to the standby mode.

Figure 7J:
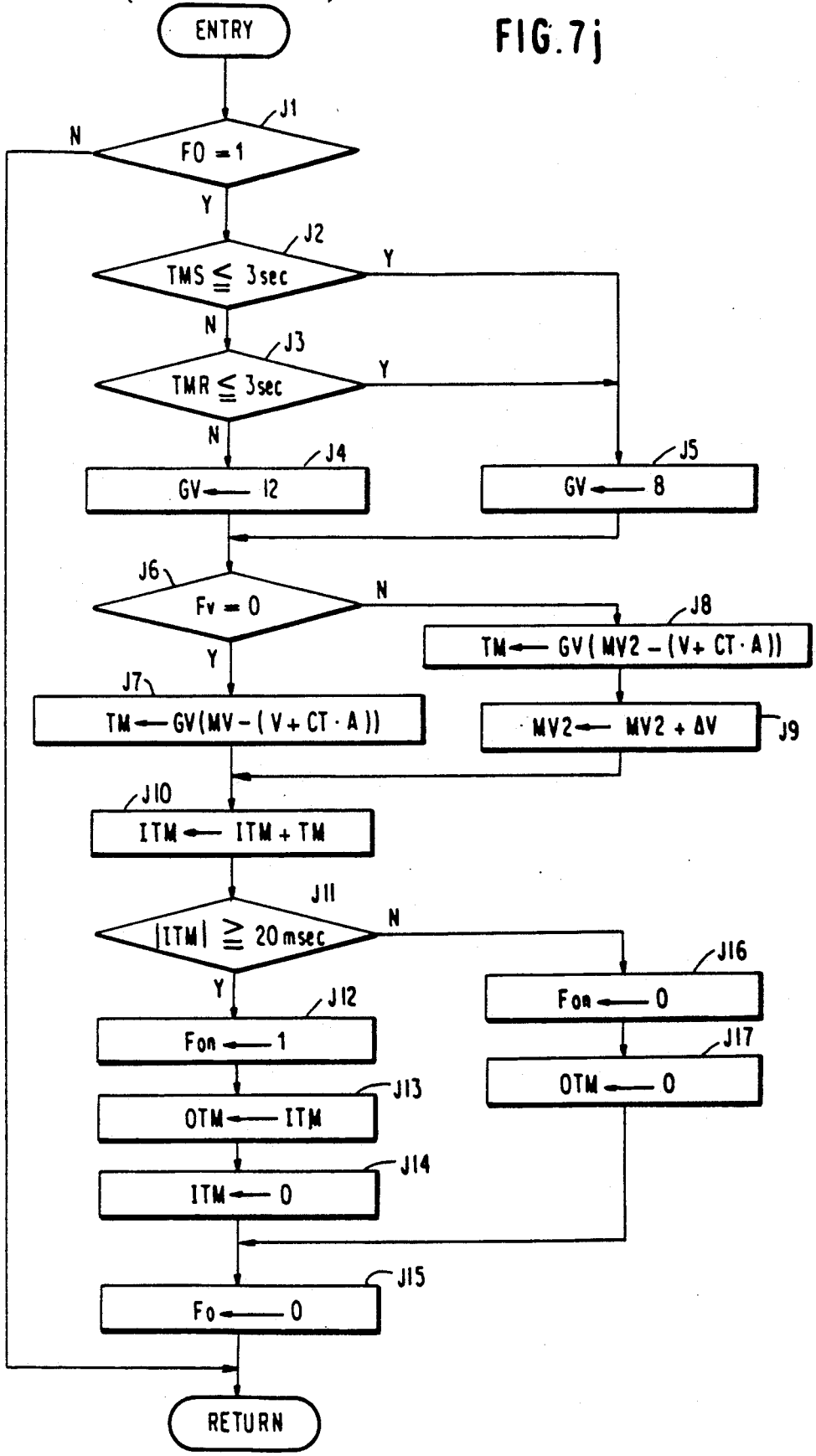

The velocity control subroutine represented by steps E2, F3, and F9 of various figures is now described. The contents of this subroutine are illustrated in FIG. 7j. First, a flag F◯ is checked (step J1). If it is not 1, then this subroutine is immediately ended. If the flag F◯ is 1, step J2 and subsequent processing are carried out. The flag F◯ is set to 1 every 50 msec as described later. After executing this subroutine, the flag is cleared, or set to 0 (step J15). Consequently, it substantially follows that this subroutine is performed once every 50 msec, i.e., periodically.

The contents of registers TMS and TMR which are used as software timers are checked at steps J2 and J3, respectively. The register TMS is cleared when the set switch Sr is opened (at step A3 shown in FIG. 7a). The elapsed time is held in the register. Likewise, the register TMR is cleared when the RESUME switch Sr is opened (step A3 shown in FIG. 7a). The elapsed time is retained in this register.

If the contents of the register TMS or TMR are less than 3 seconds, control goes to step J5. In other cases, control proceeds to step J4. That is, for three seconds immediately after the operation mode is switched from the decelerate mode, or the coast down mode, to the cruise-control mode, or for three seconds immediately after the operation mode is switched from the accelerate mode to the cruise-control mode, step J5 is executed. In other cases, step J4 is performed.

Gain GV that is used to calculate the controlled amount, or energization time, assumes different values between steps J4 and J5. In this example, immediately after the operation mode is switched from the decelerate mode or accelerate mode to the cruise-control mode, the gain is automatically set to a value less than normal values. The gain is automatically adjusted according to the present conditions, in order that the passengers feel less uncomfortable when the operation mode is switched, and to improve the response in the cruise-control mode, for rendering small the difference between the intended vehicle velocity and the actual vehicle velocity.

Figure 10:
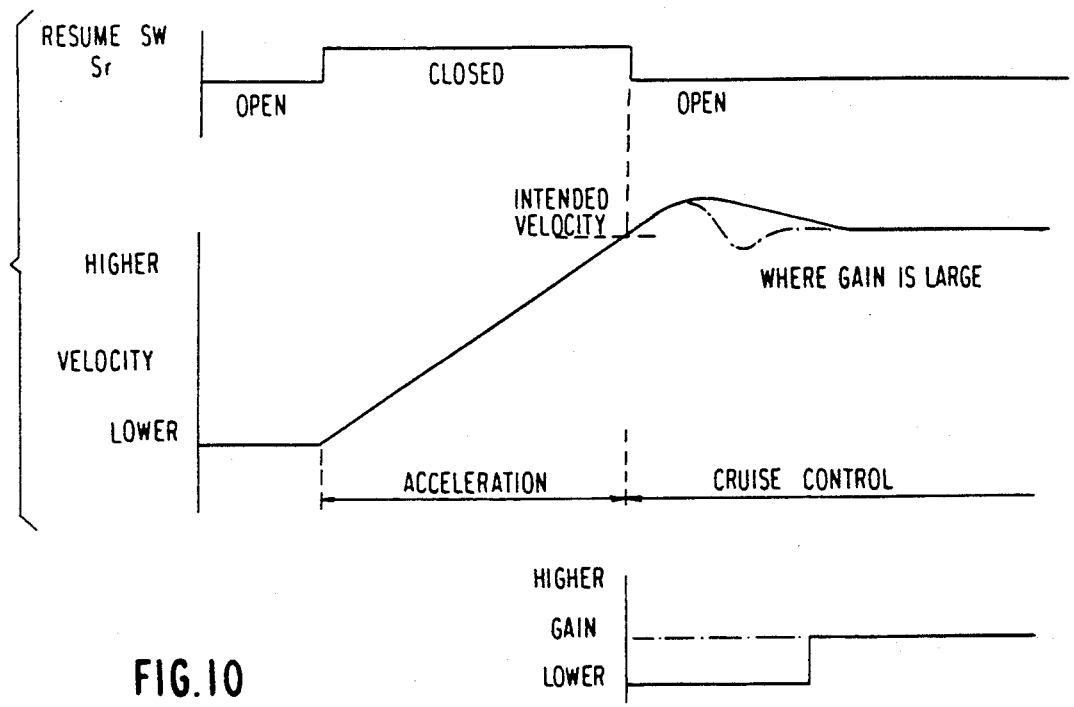
FIG. 10 is a timing chart illustrating the relations of the condition of a RESUME switch to the vehicle velocity and to the gain.

We now give an example in which the RESUME switch Sr is operated to switch the operation mode from the accelerate mode to the cruise-control mode. Referring to FIG. 10, the RESUME switch Sr is opened to switch the operation mode to the cruise-control mode from the accelerate mode. At this time, because of the response lag of the engine, the vehicle velocity once exceeds the intended velocity and then settles back into the intended velocity, thus producing hunting. If the gain of the control system is relatively large, a large deceleration is produced to quickly return the overreached vehicle velocity to the intended vehicle velocity. In this case, therefore, the passengers who have experienced an acceleration are suddenly subjected to a large deceleration. Further, because the deceleration is normally too great, the vehicle velocity becomes lower than the intended velocity. For this reason, the vehicle is again accelerated. In this way, the passengers undergo acceleration and deceleration alternately. Hence, they feel very uncomfortable.

Accordingly, when the operation mode is switched from the accelerate mode to the cruise-control mode, the gain is set to a small value. In this case, the vehicle velocity surpassing the intended velocity relatively slowly settles down to the intended velocity. Since the vehicle velocity changes slowly, the passengers hardly feel hunting when the operation mode is switched. Hence, they are prevented from feeling uncomfortable.

However, if the small gain is maintained, the control system responds slowly and so it takes a long time for the vehicle velocity to settle down to the intended velocity. This produces a large difference between the vehicle velocity and the intended velocity to thereby deteriorate the performance of the cruise-control system. In this example, the gain is temporarily reduced only immediately after the operation mode is switched from the decelerate or accelerate mode to the cruise-control mode, so that the passengers are kept from feeling uncomfortable. Further, the response can be improved in the cruise-control mode. In this mode, the difference between the actual vehicle velocity and the intended velocity is relatively small. Therefore, even if the gain is relatively large, it is unlikely that the vehicle velocity changes suddenly. Hence, the possibility that the automobile causes the passengers discomfort is eliminated.

Referring still to FIG. 7j, a flag Fv is checked (step J6). This flag is used to ascertain whether the operation mode is the cruise-control mode or the accelerate mode. To carry out the cruise-control mode, the flag Fv is reset. To accelerate the vehicle, the flag is set.

In the cruise-control mode, step J7 is carried out to find the controlled amount that is the time for which the motor is energized. In this example, a calculation is performed according to the equation.

$$\text{the energization time} = GV(MV - (V + CT \cdot A))$$

where GV is the gain, MV is the intended vehicle velocity, V is the measured actual vehicle velocity, CT is a compensation time, and A is the acceleration. The result is held in the register TM. Therefore, as the difference between the actual vehicle velocity and the intended velocity increases, the controlled amount, or the time for which the motor is energized, increases. In the above calculation, the polarity, i.e., the direction in which the energizing electric current flows, is varied, depending on whether the actual vehicle velocity is greater than the intended vehicle velocity.

When the flag Fv is 1, i.e., in the accelerate mode, step J8 is performed. The calculation performed in this processing is similar to the calculation at step J7 except that the intended vehicle velocity MV is replaced by a second intended vehicle velocity MV2. The value of this velocity MV2 is increased by ΔV whenever the next step J9 is carried out. That is, in the accelerate mode, the opening of the actuator, or the throttle opening, is gradually increased with time.

The contents of the register TM which holds the newest time calculated at step J7 or J8 are added to the contents of an accumulator ITM (step J10).

The contents, or an absolute value, of the accumulator ITM are compared with 20 msec (step J11). If the value held in the accumulator ITM exceeds 20 msec, then control goes to step J12, where the flag Fon for permitting energization is set. The value held in the accumulator ITM is transferred into an output register OTM. Then, the accumulator ITM is cleared.

If the value held in the accumulator ITM is less than 20 msec (step J11), then control proceeds to step J16, where the flag Fon for permitting energization is reset. Also, the output register OTM is cleared.

Figure 7L:
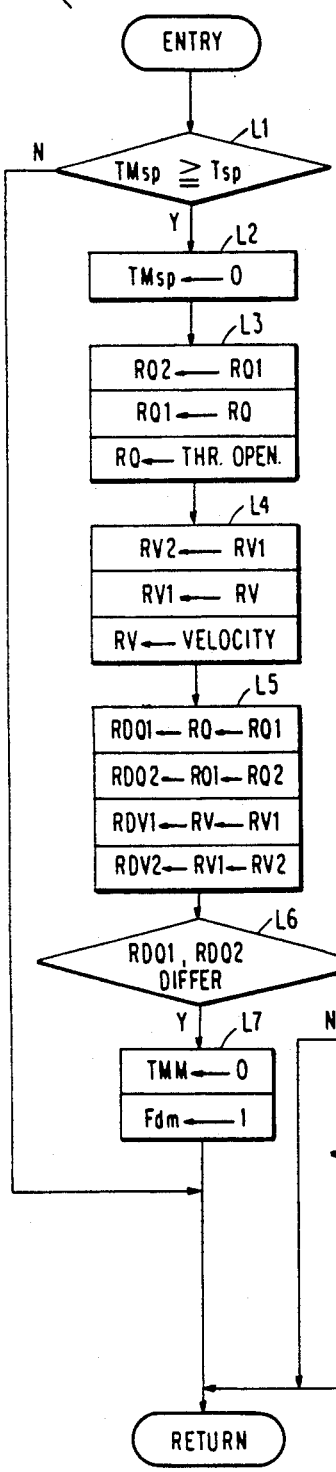
Figure 7K:
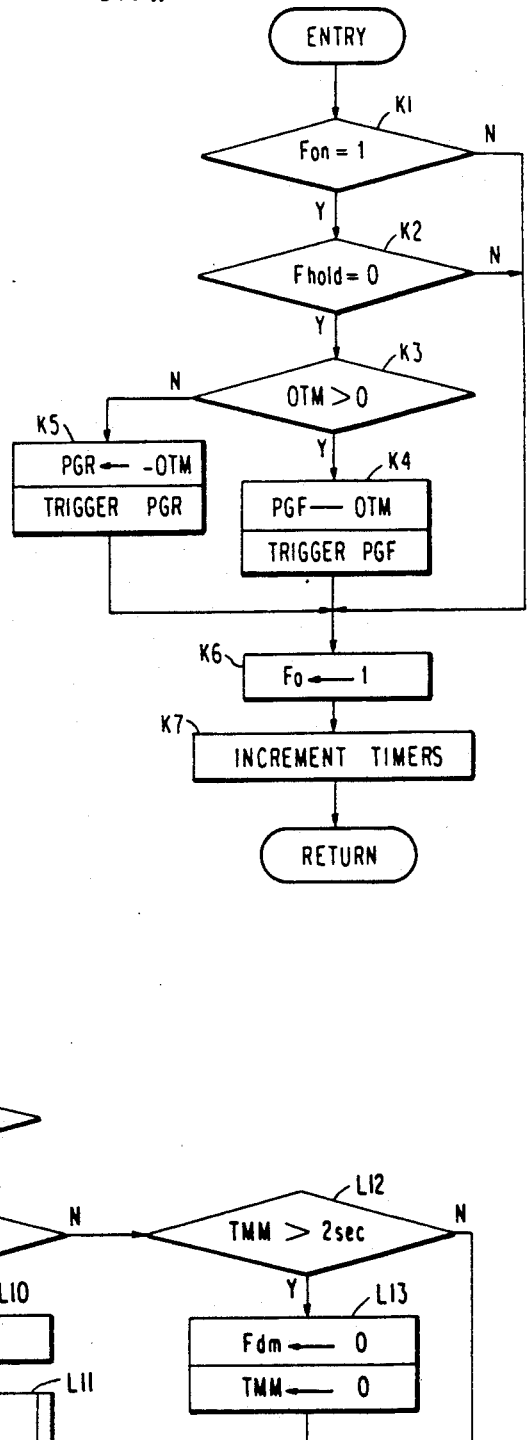

Referring next to FIG. 7k, there is illustrated a 50 msec timer interrupt processing. This processing is carried out by the hardware timer incorporated in the microcomputer 291 in response to the timer interrupt request issued every 50 msec. That is, this processing is performed every 50 msec.

If the flag Fon for permitting energization is set, and if a hold flag Fhold is reset, then control goes to step K3, where the sign of the value held in the output register OTM is checked to know the direction in which energizing electric current flows. If the value held in the register OTM is positive, control goes to step K4, where the value held in the register OTM is transferred into a first timer PGF (not shown) incorporated in the timer 240 to trigger the timer PGF. Then, the timer PGF produces a pulse signal SG1 having a duration corresponding to the value held in the register OTM. When this pulse signal appears, the driver 250 supplies electric current to the motor 291 to rotate it clockwise. In reality, therefore, the time for which electric current flows corresponds to the value held in the output register OTM. This time determines the degree to which the motor 291 is energized.

If the value held in the output register OTM is negative (step K3), then control proceeds to step K5, where the value retained in the register OTM is transferred into a second timer PGR (not shown) incorporated in the timer 240 to trigger the timer PGR. Then, the timer PGR produces a pulse signal SG2 having a duration corresponding to the value held in the register OTM. When this pulse signal appears, the driver 250 energizes the motor 291 with electric current flowing in the direction to rotate it counterclockwise.

That is, if the value held in the output register OTM is positive, the motor 291 is driven in a clockwise direction. If the value is negative, the motor 291 is turned in a counterclockwise direction.

If the flag Fon for permitting energization is reset (step K1), it follows that neither step K4 nor step K5 is carried out. Thus, neither the signal SG1 nor the signal SG2 appears at the output terminal of the timer 240. Consequently, the driver 250 does not energize the motor 291.

Referring next to FIG. 7j, if the value held in the accumulator ITM is less than 20 msec (step J11), then the flag Fon for permitting energization is reset. If the total of the remaining energization times obtained by these processings is less than 20 msec, the motor 291 is not energized. In this example, energizing pulses are produced at intervals of 50 msec. Actually, the energizing pulses SG1 or SG2 are produced and the motor 291 is energized after the accumulated value reaches 20 msec. If the motor 201 is electrically energized even when it is not necessary to operate the actuator actually, the motor is operated more frequently. This shortens the life of the motor.

Figure 9:
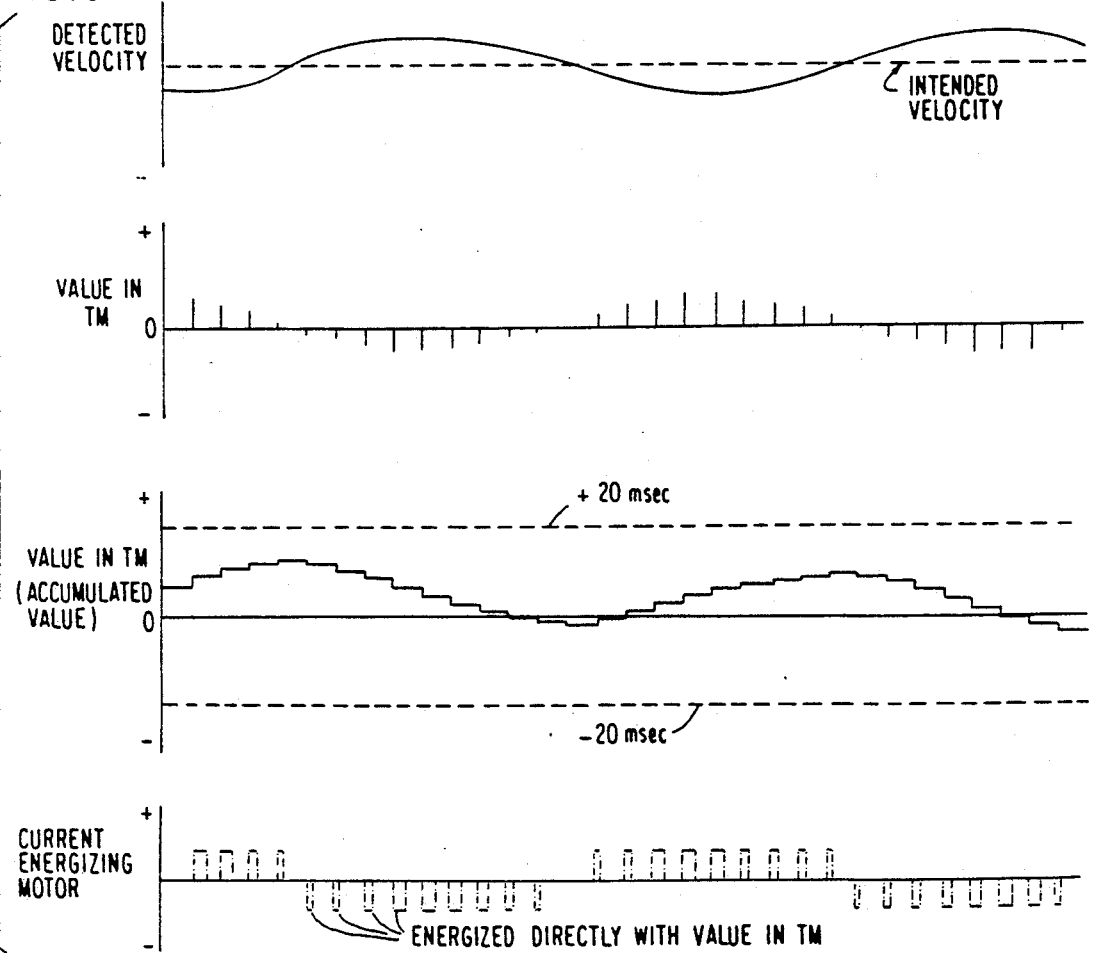
FIG. 9 is a timing chart illustrating the manner in which the electric motor shown in FIG. 6 is energized.

Specifically, the signal produced from the vehicle velocity sensor generally contains noise. Therefore, if the actual vehicle velocity is constant, the detected vehicle velocity pulsates. Accordingly, when the automobile runs in the cruise-control mode, if the vehicle velocity actually agrees with the intended velocity, the detected vehicle velocity swings up and down about the intended velocity as shown in FIG. 9. If the electric motor 291 were energized for the time calculated at step J7, the motor would not be rotated back and forth frequently by being energized with electric current indicated by the dot-and-dash line in FIG. 9. As a result, the lifetime of the actuator including the motor 291 would be shortened.

In this example, the energization time is updated by calculation every 50 msec. If the energization time swings up and down alternately within a relatively narrow range, positive values are canceled by negative values as shown FIG. 9, whereby the energization time is averaged. Therefore, the frequency with which the accumulated value reaches 20 msec is very low. Consequently, the motor 291 is operated much less frequently. This prolongs the life of the actuator.

Referring again to FIG. 7k, the flag F◯ is set (step K6), and then control goes from step J1 to step J2 (FIG. 7j). Therefore, it substantially follows that the processing illustrated in FIG. 7j is carried out immediately after the execution of the interrupt processing illustrated in FIG. 7k, and is repeated at intervals of 50 msec (step K7).

The registers including TMS, TMR, and TMR2 which are employed as software timers are incremented if their counting operations are allowed.

The response characteristic measuring subroutine of step B11 (FIG. 7b) is now described. The contents of this processing are illustrated in FIG. 7l. The substantial portion of this processing is carried out at intervals of a given time Tsp. In particular, whenever the value measured by a software timer TMsp reaches Tsp, the processings subsequent to step L3 are executed.

The contents of registers RQ1 and RQ are transferred into registers RQ2 and RQ1, respectively, and the throttle opening detected at this time is held in a register RQ (step L3). That is, the throttle opening detected by the potentiometer PT2 is periodically sampled. The newest data, the data obtained by the immediately previous sampling, and the data derived by the one more previous sampling are held in the registers RQ, RQ1, RQ2, respectively.

The contents of registers RV1 and RV are transferred into registers RV2 and RV1, respectively, and the vehicle velocity V detected at this time is held in the register RV (step L4). Thus, the detected vehicle velocity is periodically sampled. The newest data, the data obtained by the immediately previous sampling, and the data derived by the one more previous sampling are held in the registers RV, RV1, RV2, respectively.

At step L5, the difference between the values held in registers RQ and RQ1 is placed into a register RDQ1. The difference between the values held in registers RQ1 and RQ2 is retained in a register RDQ2. The difference between the values held in registers RV and RV1 is placed into a register RDV1. The difference between the values held in registers RV1 and RV2 is held in a register RDV2. That is, the newest value of the amount of change in the throttle opening and the immediately previous value are held in the registers RDQ1 and RDQ2, respectively. The newest value of the amount of change in the vehicle velocity and the immediately previous value are held in the registers RDV1 and RDV2, respectively.

If the sign, or plus or minus, of the value held in the register RDQ1 differs from the sign of the value held in the register RDQ2, control goes to step L7. If their signals agree, control proceeds to step L8.

At step L7, a register TMM that is used as a software timer is cleared, and a flag Fdm is set.

If the flag Fdm is set, control goes from step L8 to step L9, where the signs of the values held in the registers RDV1 and RDV2 are checked. If they differ, control proceeds to step L10. If they agree, control goes to step L12.

At step L10, the value held in the register TMM is placed into a register RTM, and control goes to the next step L11, where a learning subroutine is carried out.

At step L12, the value held in the register TMM is checked. If the value is in excess of 2 seconds, control goes to step L13, where the flag Fdm and the register TMM are reset.

Figure 11:
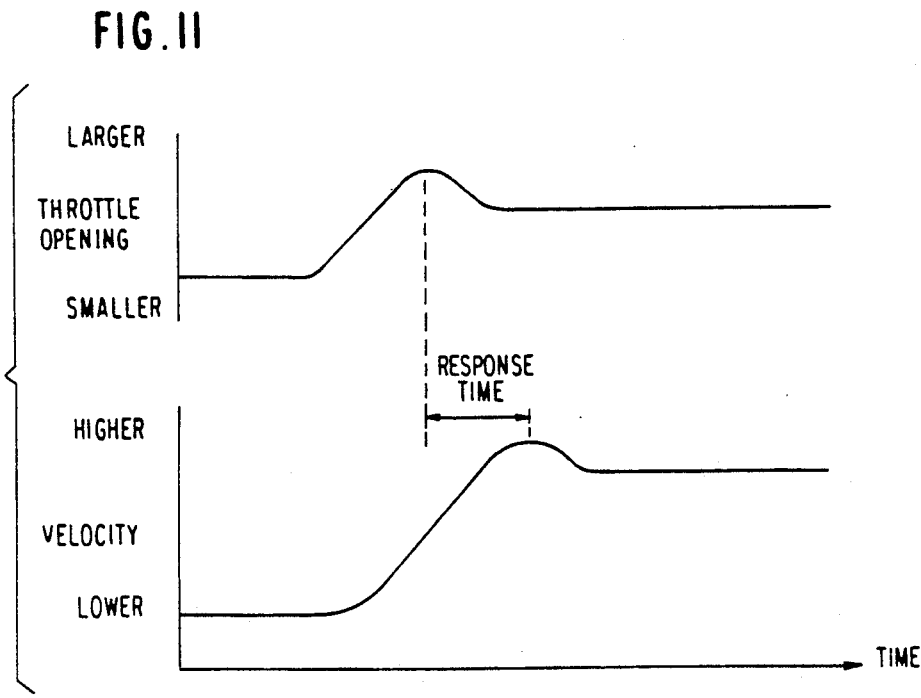
FIG. 11 is a timing chart illustrating the relation between throttle opening and vehicle velocity.

In the processing illustrated in FIG. 7l, the response characteristic of the velocity of the whole vehicle is measured. As shown in FIG. 11, when the throttle opening is changed, the vehicle velocity actually varies after a delay corresponding to the characteristics of the vehicle. In this processing, the period between the instant at which a locally maximal or minimal value of the curve indicating the change in the throttle opening is detected and the instant at which a locally maximal or minimal value of the change in the vehicle velocity is detected is defined as the response time.

More specifically, the throttle opening and the vehicle velocity are sampled at regular intervals of Tsp. If a change in the direction of tilt of the change in the throttle opening is detected, step L7 is carried out, the former change corresponding to a locally maximal or minimal value. If a change in the direction of tilt of the change in the vehicle velocity is subsequently detected, step L10 is carried out, the former change corresponding to the change in the throttle opening. The register TMM is cleared when a locally maximal or minimal value of the change in the throttle opening is detected. The value presently held in the register TMM corresponds to the elapsed time and so the value held in a register RTM at step L10 corresponds to the response time between the instant at which the throttle opening varies and the instant at which the vehicle velocity varies.

Figure 7N:
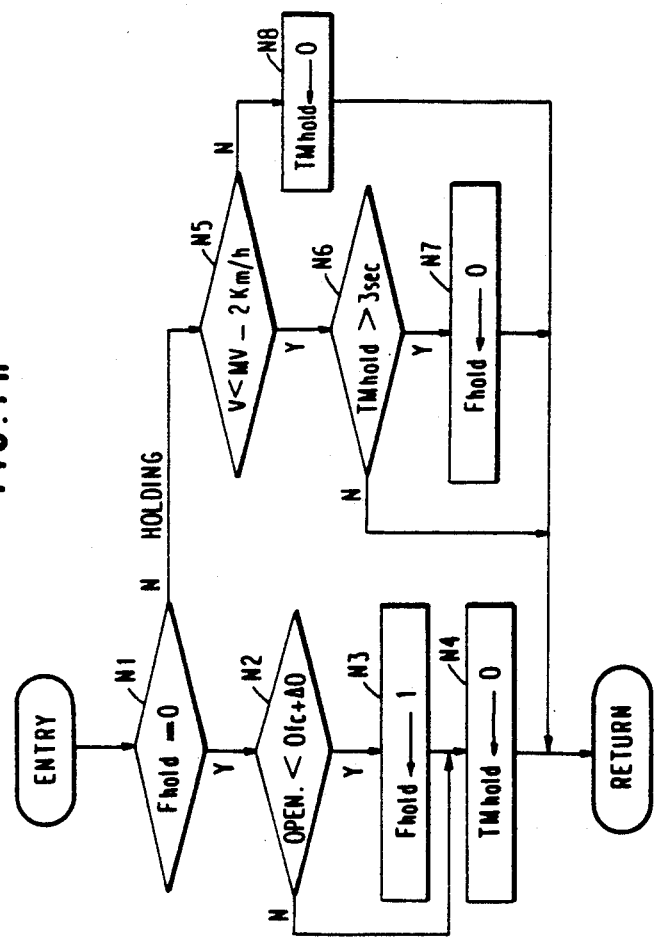
Figure 7M:
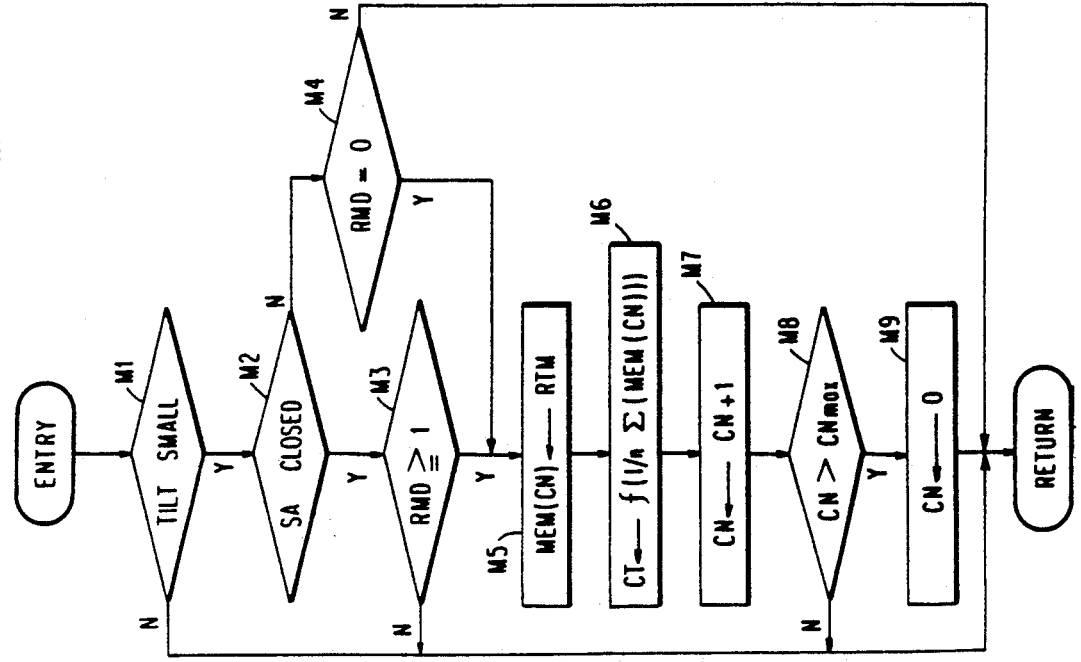

The contents of the learning subroutine of step L11 are illustrated in FIG. 7m, where a check is made to see if the tilt is large or small with reference to the output signal from the tilt sensor 270 (step M1). When the tilt is small, the processing beginning with step M2 is carried out. Accordingly, when the tilt is large, the learning processing is inhibited, because when the tilt is large, the load varies, varying the response time.

The condition of a switch SA is checked (step M2). The switch SA is used to switch the operation mode to the learning mode. In particular, if the switch SA is closed, control goes to step M3. If the value held in the mode register RMD is 1 or more, i.e., when the system is not in the standby mode but in the cruise-control mode, learning processing beginning with step M5 is effected. If the switch SA is open, control goes to step M4. If the value held in the mode register RMD is 0, i.e., the system is in the standby mode or manual mode, learning is carried out.

At step M5, the measured value of the response time is transferred from a register RTM into a learning register MEM(CN). In this example, the register MEM has n regions which store various values of the response time. The response time obtained at this time is stored in one of the regions which is indicated by the value held in a register CN. The value held in the register CN is updated whenever step M7 is performed. Since this value varies as 0, 1, 2, 3, 4, ..., n−1, 0, 1, 2, the newest n values of the response time are held in the learning register MEM as data about learning. In this example, the register MEM is included in the nonvolatile RAM 230.

At step M6, the average of the n learning data items held in the register MEM is calculated. The result is used as a parameter x, and a given function f(x) is computed. The result is held in a register which holds the compensating time employed in the calculation performed at step J7 (FIG. 7j). In this way, the results of the response time are learned, and the compensating time CT corresponding to the compensated amount of the response time of the vehicle characteristics is automatically adjusted. This makes it unnecessary to adjust the compensating time CT according to the characteristics of the vehicle. If the vehicle ages, the compensating time CT is automatically adjusted according to the characteristics which the vehicle exhibit at that time. Hence, it is by no means necessary for the human driver to adjust it.

In this example, if the value held in the register TMM exceeds 2 seconds, i.e., if any locally maximal or minimal value of the change in the vehicle velocity cannot be detected after the lapse of 2 seconds from the instant at which a locally maximal or minimal value of the change in the throttle opening is detected, a flag Fdm is reset (step L13) to inhibit learning.

Where the automobile is equipped with an automatic transmission unlike the above example, any gear shift may be inhibited during learning, or learning is allowed only when the gear is in a given position, for example the top position.

In the above example, a locally maximal or minimal value of the change is detected provided that the direction of tilt of the difference between the two successively sampled values changes. Alternatively, learning may be permitted only when the magnitude of the second-order derivative of any sampled value exceeds a given value, i.e., when a sudden change is detected.

Step B12 (FIG. 7b) illustrates a surge preventive subroutine the contents of which are illustrated in FIG. 7n. Briefly, in this processing, the throttle opening is so controlled as to prevent the electronic fuel-injection system from entering a region in which it does not inject fuel.

Specifically, when the vehicle equipped with the prior art cruise-control system goes down a long hill, if it operates in the cruise-control mode, the throttle opening gradually decreases. When the opening becomes less than a given level, the electronic fuel-injection system stops injecting fuel, thus producing a very strong engine brake. This violently reduces the vehicle velocity, which in turn increases the throttle opening. When the throttle opening exceeds a given level, the electronic fuel-injection system restarts the injection of fuel. Suddenly, the engine generates driving power, producing a strong acceleration. The vehicle velocity increases rapidly. When the vehicle velocity exceeds the intended velocity, the throttle opening is again reduced. In this way, the above process is repeated. That is, the fuel-injection system alternately stops and restarts injection of fuel. Under this condition, the acceleration varies very greatly, so that the vehicle velocity hunts strongly. Hence, the passengers feel very unpleasant.

Accordingly, in this example, the throttle opening is maintained constant before the electronic fuel-injection system enters the region in which it does not inject fuel. This is described in further detail by referring to FIG. 7n.

The condition of a hold flag Fhold is checked (step N1). Usually, this flag is reset and so control proceeds to step N2, where the present throttle opening is compared with a predetermined opening. In particular, the electronic fuel-injection system restarts injection of fuel at a threshold value ◯fc. If the throttle opening is greater than the sum of the threshold value and a very small value Δ◯, then control goes to the next step N3. When the vehicle is going down a hill, the throttle opening decreases. If the opening decreases to an opening slightly larger than the opening at which the electronic fuel-injection system stops injecting fuel, then step N3 is carried out, and the hold flag Fhold is set.

If the hold flag Fhold is set, controls goes from step K2 to step K6 during the processing illustrated in FIG. 7k. This prevents generation of energizing pulses to hold the actuator in the present position. The throttle opening is no longer reduced.

If the flag Fhold is set, control goes from step N1 to step N5, where the vehicle velocity V is compared with the intended velocity minus 2 Km/h. If the velocity V is greater than the latter value, control goes to step N8, where a register TMhold that is a software timer is cleared. If the velocity V decreases below the latter value, control proceeds to step N6, where the contents of the register TMhold are checked. This register holds a hold time. When 3 seconds elapse after the velocity becomes less than (the intended vehicle velocity − 2), control goes to step N7, where the hold flag Fhold is cleared, and the vehicle velocity is controlled in a normal manner, i.e., the throttle opening is controlled.

Figure 8:
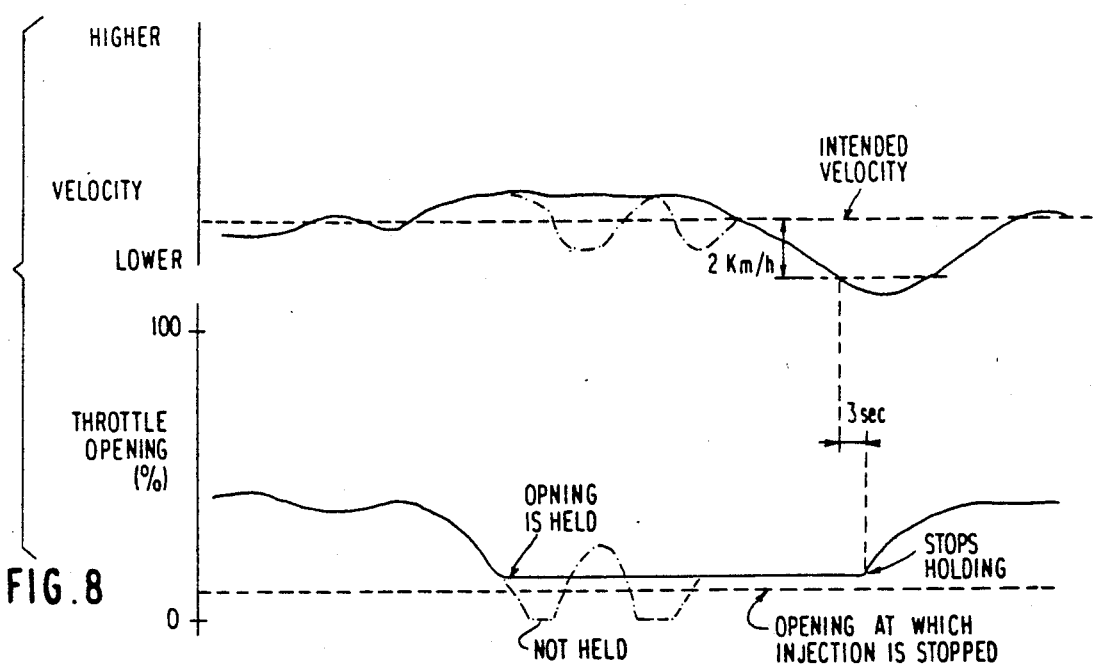
FIG. 8 is a timing chart illustrating one example of the relation of the vehicle velocity to the throttle opening when the vehicle goes down a hill.

Before the throttle opening reaches the opening at which the fuel injection stops, the opening of the actuator is held constant to thereby prevent alternate stoppage of fuel injection and restarting of the injection. The result is that the vehicle velocity changes slowly as shown in FIG. 8. Hence, the passengers feel much less uncomfortable than heretofore when the vehicle goes down a long hill.

In the above example, the actuator makes use of an electric motor. The invention can also be applied to a system using an actuator employing the negative pressure created by an automotive engine.

As described thus far, a cruise-control system according to the invention comprises: a rotational speed-determining means (65) which is mounted on the intake side of the engine of a vehicle and determines the rotational speed of the output shaft of the engine by the posture of the rotational speed-determining means; fuel supply means (17, 17a, FIV$_1$, FIV$_2$) acting to supply fuel to the engine and equipped with a posture-detecting means which detects the posture of the rotational speed-determining means, the fuel supply means cutting off the supply of fuel to the engine when the posture-detecting means detects the posture of the rotational speed-determining means that corresponds to a certain low speed of the engine; driving means (21-32, 40, 100) for modifying the posture of the rotational speed-determining means; velocity-detecting means (Mag, LSW) for detecting the present velocity of the vehicle; input means (SSW, RSW, CSW, BSW$_1$) which receive certain instructions; and control means (1-3) which, when the input means instruct the control means to maintain a certain speed, prevent the fuel supply means from cutting off the supply of fuel to the engine. The control means also act to set an intended velocity. The control means compare the intended velocity with the present velocity to energize the driving means so that the present velocity may agree with the intended velocity. When the input means instruct resumption, the control means permit the fuel supply means to cut off the supply of fuel to the engine. Thus, the control means establish cruise-control mode in response to the instructions received from the input means. The fuel supply means are prevented from cutting off the supply of fuel to the engine until the cruise-control mode is canceled. Therefore, even when the operating conditions permit cutoff of the supply of fuel, the supply of fuel to the engine is continued. Consequently, when the vehicle coasts down a hill, the vehicle velocity is prevented from surging.

Also, in accordance with the present invention, when the throttle opening is reduced to a certain opening, the actuator is locked to prevent the throttle opening from entering the region in which the throttle opening stops injection of fuel. Therefore, when the vehicle goes down a long hill, the vehicle velocity is prevented from surging. Hence, the passengers feel less uncomfortable.

What is claimed is:

1. The cruise control assembly comprising:
   electronic control means;
   actuator means connected to said electronic control means for adjusting an opening of a valve for controlling driving power produced by a power source of a vehicle;
   fuel control means connected to said electronic control means for controlling fuel supply to said power source;
   opening detecting means connected to said electronic control means for detecting an opening of said valve;
   velocity detecting means connected to said electronic control means for detecting a vehicle velocity;
   storage means connected to said electronic control means; and
   switching means connected to said velocity detecting means and said storage means for permitting storage of a desired cruise velocity in said storage means;
   said electronic control means controlling the storage of the desired cruise velocity in response to operation of said switching means, controlling the actuator means according to actual vehicle velocity detected by the velocity detecting means and according to the desired cruise velocity stored in the storage means and monitoring the valve opening detected by the opening detecting means whereby upon detecting a predetermined valve opening slightly larger than an opening at which said fuel control means cuts off fuel supply during decrease of the valve opening said electronic control means controls said actuator to maintain said predetermined valve opening constant.

2. A cruise control assembly as set forth in claim 1, wherein upon detection of an actual vehicle velocity less than the desired cruise velocity by a predetermined value while said actuator maintains said predetermined valve opening constant, said electronic control means ceases maintaining said predetermined valve opening.

* * * * *